US010826292B2

(12) United States Patent
Sheng et al.

(10) Patent No.: US 10,826,292 B2
(45) Date of Patent: Nov. 3, 2020

(54) MULTI-TIME-SCALE DIGITAL/ANALOG HYBRID SIMULATION SYSTEM AND METHOD FOR POWER DISTRIBUTION NETWORK AND STORAGE MEDIUM

(71) Applicants: CHINA ELECTRIC POWER RESEARCH INSTITUTE COMPANY LIMITED, Beijing (CN); STATE GRID CORPORATION OF CHINA, Beijing (CN)

(72) Inventors: Wanxing Sheng, Beijing (CN); Keyan Liu, Beijing (CN); Xiaoli Meng, Beijing (CN); Weijie Dong, Beijing (CN); Yajie Li, Beijing (CN); Xueshun Ye, Beijing (CN); Yongmei Liu, Beijing (CN); Yinglong Diao, Beijing (CN); Dongli Jia, Beijing (CN); Lijuan Hu, Beijing (CN); Kaiyuan He, Beijing (CN)

(73) Assignees: CHINA ELECTRIC POWER RESEARCH INSTITUTE CO. LTD., Beijing (CN); STATE GRID CORPORATION OF CHINA, Beijing (CN)

( * ) Notice: Subject to any disclaimer, the term of this patent is extended or adjusted under 35 U.S.C. 154(b) by 408 days.

(21) Appl. No.: 15/750,829

(22) PCT Filed: Jun. 28, 2017

(86) PCT No.: PCT/CN2017/090523
§ 371 (c)(1),
(2) Date: Feb. 6, 2018

(87) PCT Pub. No.: WO2017/198237
PCT Pub. Date: Nov. 23, 2017

(65) Prior Publication Data
US 2019/0067939 A1    Feb. 28, 2019

(30) Foreign Application Priority Data
May 18, 2016    (CN) .......................... 2016 1 0331069

(51) Int. Cl.
*H02J 3/00* (2006.01)
*G05B 19/042* (2006.01)

(52) U.S. Cl.
CPC .............. *H02J 3/00* (2013.01); *G05B 19/042* (2013.01); *G05B 2219/2639* (2013.01);
(Continued)

(58) Field of Classification Search
CPC ......... H02J 3/00; H02J 2203/20; Y02E 60/76; Y04S 40/22; G05B 19/042; G05B 2219/2639; G06Q 50/06; G06F 30/367
See application file for complete search history.

(56) References Cited

U.S. PATENT DOCUMENTS 3,839,629 A * 10/1974 Russell ..................... G06J 1/00
                                                                703/3
6,205,122 B1 * 3/2001 Sharon ..................... H04L 41/12
                                                                370/254
(Continued)

FOREIGN PATENT DOCUMENTS

CN      102799715 A     11/2012
CN      103345162 A     10/2013
(Continued)

OTHER PUBLICATIONS

Tao et al. "Study on Method of Digital/Analog Hybrid Simulation for the Ultra-High Voltage Grid" 2008 Joint int. Conf. on Power Sys. Tech. [retrieved Apr. 6, 2020]. Retrieved from <https://ieeexplore.ieee.org/document/4745373> (Year: 2008).*
(Continued)

*Primary Examiner* — Rehana Perveen
*Assistant Examiner* — Alfred H B Wechselberger
(74) *Attorney, Agent, or Firm* — Syncoda LLC; Feng Ma

(57) ABSTRACT

An embodiment provides a multi-time-scale Digital/Analog (D/A) hybrid simulation system and simulation method therefor for a complex power distribution network and a computer storage medium, and is intended to solve existing problems about multi-time-scale modeling and simulation of the complex power distribution network and simulation
(Continued)

accuracy and efficiency of the complex power distribution network. The embodiment provides a multi-time-scale D/A hybrid simulation solution for the complex power distribution network, designs a D/A hybrid interface device and a coordination mechanism, and may effectively implement multi-time-scale real-time simulation of equipment (for example, power electronic equipment including a complex topological structure and a novel control strategy) of the complex power distribution network and multi-time-scale simulation analysis on grid connection/disconnection of a distributed power supply such as a wind-driven generator, a photovoltaic power generator and a gas turbine and an electric vehicle as well as interactive influence with the power distribution network.

10 Claims, 21 Drawing Sheets

(52) U.S. Cl.
CPC ........... *H02J 2203/20* (2020.01); *Y02E 60/00* (2013.01); *Y04S 40/20* (2013.01)

(56) References Cited

U.S. PATENT DOCUMENTS

| | | | | |
|---|---|---|---|---|
| 2008/0055822 | A1* | 3/2008 | Rearick | H04Q 1/03 361/641 |
| 2013/0073062 | A1* | 3/2013 | Smith | G06Q 50/06 700/33 |
| 2015/0207321 | A1* | 7/2015 | Kashiwagi | H02J 3/005 700/286 |
| 2017/0091791 | A1* | 3/2017 | Srinivasan | H02J 3/381 |

FOREIGN PATENT DOCUMENTS

| | | |
|---|---|---|
| CN | 103971557 A | 8/2014 |
| CN | 104123675 A | 10/2014 |
| CN | 104330979 A | 2/2015 |
| CN | 105932666 A | 9/2016 |

OTHER PUBLICATIONS

PowerFactory [User Manual], Version 15. DlgSilent GmBH, Gomaringen, Germany [retrieved on Apr. 22, 2020]. Retrieved from <http://read.pudn.com/downloads704/sourcecode/app/2831623/UserManual_en.pdf> (Year: 2015).*

Faruque et al. "Real-Time Simulation Technologies for Power Systems . . . "IEEE Power and Energy Technology Sys [retrieved on Apr. 6, 2020]. Retrieved from <https://ieeexplore.ieee.org/docunnent/7138557> (Year: 2015).*

Chen et al. "Multi-FPGA digital hardware design for detailed large-scale real-time electromagnetic transient simulation of power systems" IET Generation, Transmission & Distribution [retrieved on Apr. 6, 2020]. Retrieved from <https://ieeexplore.ieee.org/document/6531915> (Year: 2012).*

Vanfretti et al. "SmarTS Lab—A Laboratory for Developing Applications for WAMPAC Systems" 2012 IEEE Power and Energy Soc . General Meeting [retrieved on Apr. 22, 2020]. Retrieved from <https://ieeexplore.ieee.org/document/6344839>.*

Taoka et al. "Real-Time Digital Simulator with Digital/Analog Conversion Interface for Testing Power Instruments" IEEE Transactions on Power Systems [retrieved on Apr. 16, 2020]. Retrieved from <https://ieeexplore.ieee.org/docunnent/317628/>.*

Prokhorov et al. Real Time Hybrid Simulation of Electrical Power Systems: Concept, Tools, Field Experience and Smart Int. Journ. of Smart Grid [retrieved on Apr. 6, 2020]. Retrieved <https://www.researchgate.net/publication/270506335_Real_Time_Hybrid_Simulation_of_Electrical>.*

McLaren et al. "New Simulation Tools for Power Systems" 2001 IEEE/PES, vol. 1 [retrieved on May 7, 2020]. Retrieved from <https://www.researchgate.net/publication/3929592_New_simulation_tools_for_power_systems>.*

International Search Report in international application No. PCT/CN2017/090523, dated Sep. 27, 2017.

* cited by examiner

MULTI-TIME-SCALE DIGITAL/ANALOG HYBRID SIMULATION SYSTEM AND METHOD FOR POWER DISTRIBUTION NETWORK AND STORAGE MEDIUM

CROSS-REFERENCE TO RELATED APPLICATIONS

The present application is filed based upon Chinese Patent Application No. 201610331069.1, filed on May 18, 2016, and claims benefit of U.S. Provisional application. The contents of the Chinese Patent Application are hereby incorporated by reference in its entirety.

TECHNICAL FIELD

The disclosure relates to a simulation system and a simulation method therefor, and particularly to a multi-time-scale Digital/Analog (D/A) hybrid simulation system and simulation method therefor for a complex power distribution network and a computer storage medium.

BACKGROUND

In recent years, with increase of a power supply requirement and development of a power distribution network technology, a power distribution network keeps expanding on its scale and gets increasingly complex in structure, and its characteristics of large scale, multiple nodes, complex equipment and multiple running manners get increasingly highlighted. In addition, with rapid development of a renewable energy grid connection technology and a novel power electronic technology, access of a large number of distributed power supplies, microgrids, high-capacity chargers, energy storage systems and the like on a power distribution network side makes a running manner of the power distribution network increasingly complex and endows a structure and parameter of the power distribution network with significant decentrality, asymmetry and diversity.

Multi-time-scale simulation of a power distribution network is a powerful tool for improving a running and analytic decision making capability. There are mainly two multi-time-scale simulation methods for the power distribution network at present, i.e., physical simulation of a power distribution network and all-digital multi-time-scale simulation of a power distribution network. The physical simulation of the power distribution network refers to analog simulation with physical model equipment, may obtain a detailed simulation result, and is high in reliability. However, it also has the shortcomings that a period is long due to a limit of a simulation scale, and hardware equipment is usually expensive and relatively more difficult to maintain and operate. All-digital multi-time-scale simulation of the power distribution network is low in cost and time consumption and high in calculation speed, and may simulate a large-scale power distribution network. However, accuracy of a simulation calculation result of the all-digital multi-time-scale simulation is poorer than physical simulation due to a limit of complexity of a simulation object. In addition, a power distribution network has the characteristics of large scale, multiple equipment types, asymmetric structure and parameter and the like, and is accessed by distributed power supplies adopting complex control strategies, so that it is relatively more difficult to implement multi-time-scale real-time simulation of a power distribution system.

A simulation process for a complex power distribution network has a relatively more obvious characteristic of multiple time scales, and includes steady simulation and transient simulation. The transient simulation may further be divided into an electromagnetic multi-time-scale process and an electromechanical multi-time-scale process. Compared with a conventional power system, the complex power distribution network has its own characteristics. The characteristics mainly includes: 1) there are a great variety of novel components in various forms, including a static Direct Current (DC) type power supply as well as a rotating Alternating Current (AC) motor; 2) control over the complex power distribution network is complex, including control over a distributed power inverter and an energy storage component, control over power electronic equipment, voltage and frequency adjustment of a network layer and the like; 3) most of distributed power supplies are required to supply power to power grids or loads through power electronic converters; 4) many distributed power supplies are intermittent and random in output, and are usually required to be matched with energy storage equipment, power compensation devices and distributed power supplies of other types to achieve relatively higher dynamic and static performance; and 5) medium/low-capacity distributed power supplies mostly access medium/low-voltage power distribution networks, asymmetry of network parameters and the loads is greatly increased at this moment, and in addition, distributed power supplies on user sides may be grid-connected through single-phase inverters, which worsens system asymmetry more.

Therefore, a running state of a complex power distribution network may vary with a change in an environmental condition, increase and decrease of a load requirement, adjustment of power output, a change in a running manner and occurrence of a failure or disturbance. A multi-time-scale process may also get more complex. Compared with the conventional power system, the complex power distribution network is larger in time scale span and closer in coupling between dynamic processes. FIG. 1 shows time scales corresponding to different simulation processes for a complex power distribution network. In recent years, with increase of a power supply requirement and development of a power distribution network technology, a power distribution network keeps expanding on its scale and gets increasingly complex in structure, and its characteristics of large scale, multiple nodes, complex equipment and multiple running manners get increasingly highlighted. In addition, with increase of development and input of renewable energy and novel energy technologies, access of a large number of distributed power supplies, microgrids, high-capacity chargers, energy storage systems and the like to the power distribution network on a power distribution network side makes a running manner increasingly complex and endows a structure and parameter of the power distribution network with obvious uniqueness, asymmetry and diversity.

Transient simulation of a power distribution network is a powerful tool for improving a running and analytic decision making capability. There are mainly two transient simulation methods for the power distribution network at present, i.e., physical simulation of the power distribution network and all-digital transient simulation of the power distribution network. The physical simulation refers to analog simulation with physical model equipment, may obtain a detailed simulation result, and is high in reliability. However, it also has the shortcomings that a period is long due to a limit of a simulation scale, and hardware equipment is usually expensive and relatively more difficult to maintain and operate. All-digital transient simulation of the power distribution network is low in cost and time consumption and high in calculation speed, and may simulate a large-scale power distribution network. However, the accuracy of the simulation calculation result of the all-digital transient simulation is poorer than physical simulation due to a limit of complexity of a simulation object, and precision is poor. In addition, the power distribution network has the characteristics of large scale, multiple equipment types, asymmetric structure and parameter and the like, and is accessed by distributed power supplies adopting complex control strategies, so that it is relatively more difficult to implement power distribution system transient real-time simulation.

A transient simulation process for a complex power distribution network has a relatively more obvious characteristic of multiple time scales, and may be divided into an electromagnetic transient process and an electromechanical transient process. Compared with a conventional power system, the complex power distribution network has its own characteristics. The characteristics mainly include: 1) there are a great variety of novel components in various forms, including a static DC type power supply as well as a rotating AC motor; 2) control over the complex power distribution network is complex, including control over a distributed power supply and an energy storage component, control over a power electronic converter, voltage and frequency adjustment of a network layer and the like; 3) most of distributed power supplies are required to supply power to power grids or loads through power electronic converters; 4) many distributed power supplies are intermittent and random in output, and are usually required to be matched with energy storage equipment, power compensation devices and distributed power supplies of other types to achieve relatively higher dynamic and static performance; and 5) medium/low-capacity distributed power supplies mostly access medium/low-voltage power distribution networks, asymmetry of network parameters and the loads is greatly increased at this moment, and in addition, distributed power supplies on user sides may be grid-connected through single-phase inverters, which worsens system asymmetry more.

Therefore, a running state of a complex power distribution network may vary with a change in an environmental condition, increase and decrease of a load requirement, adjustment of power output, a change in a running manner and occurrence of a failure or disturbance, a transient process may also get more complex. Compared with the conventional power system, the complex power distribution network is larger in time scale span and closer in coupling between dynamic processes. FIG. 1 shows time scales corresponding to different transient processes for a complex power distribution network.

In terms of power grid digital simulation, analog simulation and D/A hybrid simulation, there have been typical related disclosures as follows.

(1) Chinese Disclosure Application No. 201310153712.2 entitled "Power distribution network simulation research and analysis system and method based on network-wide data". This disclosure discloses technical characteristics of each layer such as a data layer, a platform layer and an application layer in a digital simulation system for a power distribution network. However, this technology is directed to conventional steady process simulation of the power distribution network. This technology has no detailed models of components such as a distributed power supply, a power electronic device and flexible AC and DC equipment, is low in simulation speed. This technology cannot implement real-time simulation and transient simulation of the power distribution network.

(2) Chinese Disclosure Application No. 201410602141.0 entitled "Analog simulation system of complex power distribution network". This disclosure discloses technical characteristics of five major modules, i.e. a power simulation unit, a line simulation unit, a load simulation unit, a control simulation unit and a protection simulation unit, in the analog simulation system for the power distribution network. However, the analog simulation system for the power distribution network is high in equipment construction cost, large in occupied area and undiversified in simulation scenario, and cannot implement multi-scenario simulation of the power distribution network.

(3) Chinese Disclosure Application No. 201310283532.6 entitled "Power level digital-analog hybrid simulation system". This disclosure discloses technical characteristics of a hardware circuit and digital model in a D/A hybrid simulation system, and elaborates a topological structure and working principle of a power connecting interface with an emphasis. However, transient simulation with the D/A hybrid simulation system has the problem of asynchrony between a digital side and an analog side. In addition, the conventional art is oriented to a power transmission network, and simulation requirements of a complex power distribution network with the characteristics of multiple segments, multiple connections, multiple running states, high R/X ratio, large scale, complex structure, multiple nodes, large coverage and the like on component modeling, process modeling, algorithm solving, function setting and the like cannot be met.

Thus it can be seen that the abovementioned disclosures all have certain shortcomings, and it is necessary to seek for a novel simulation system and simulation method.

SUMMARY

In order to solve the shortcomings of the conventional arts, embodiments of the disclosure are intended to provide a complex power distribution multi-time-scale D/A hybrid simulation system, a simulation method therefor and a computer storage medium. The method adopts multi-time-scale digital and multi-time-scale real-time simulation for a conventional power distribution network unit part, and performs simulation by adopting physical model equipment for equipment and network of which internal mechanisms have yet not been deeply researched and are difficult to express with digital formulae and model and high in simulation accuracy, and a digital part and an analog part implement joint real-time simulation through a D/A hybrid interface unit and a synchronization mechanism.

The purpose of the disclosure is achieved by adopting the following technical solutions.

In order to solve the technical problems, an aspect of the embodiments of the disclosure provides a multi-time-scale D/A hybrid simulation system for a complex power distribution network, which is improved as follows: the D/A hybrid simulation system is configured to implement single voltage class and multi-voltage class-based multi-time-scale D/A hybrid simulation of an AC power grid, a DC power grid and an AC and DC hybrid power grid, the D/A hybrid simulation system including:

a digital simulation system, configured to perform D/A hybrid transient simulation on the power distribution network including a distributed power supply;

a D/A hybrid interface device, configured to perform synchronization for data coordination and time consistency;

a physical simulation circuit, configured to construct a topological structure of a complex power distribution network; and a underlying-layer design module, configured to provide a real-time synchronization simulation technology for a simulation layer of the digital simulation system and provide a Field-Programmable Gate Array (FPGA)-based time adjustment technology for the digital simulation system and the D/A hybrid interface device, wherein the digital simulation system and the physical simulation circuit are connected through the D/A hybrid interface device to form a multi-time-scale simulation system which is a loop.

In an embodiment, design of the digital simulation system includes: design of an interaction layer, design of a modeling layer and design of the simulation layer; design of the interaction layer is configured to be responsible for visual interaction with a user, construct a simulation circuit by adopting a component model pattern established by the modeling layer and perform parameter setting for simulation components; design of the modeling layer is configured to be responsible for mathematical modeling for simulation components, component parameter definition, parameter estimation and verification and component pattern appearance design; and design of the simulation layer is configured to be instructed by the interaction layer to perform simulation calculation on the simulation circuit constructed by the interaction layer on the basis of a simulation component mathematical model established by the modeling layer with reference to a corresponding parameter setting for simulation components, including design of parallel calculation of an electrical system and a control system and FPGA-based design of a digital frame.

In an embodiment, the underlying-layer design module adopts a logical programming-based FPGA to perform hardware-accelerated digital simulation, and simultaneously adopts a multi-FPGA partition paralleling method to accelerate system-level digital simulation of the power distribution network.

In an embodiment, the D/A hybrid interface device includes:

a data acquisition unit, configured to acquire and send a voltage and current signal of the simulation circuit constructed by the simulation modeling layer to the digital simulation system;

a power amplification unit, configured to implement power amplification of the current signal of the digital simulation system and convert a digital signal into a real current signal for participating in running of the physical simulation circuit; and a switch signal unit, configured to implement isolated sending of a switch signal between the digital simulation system and the physical simulation circuit.

In an embodiment, the data acquisition unit includes a data buffer, Analog/Digital (A/D) data collector and voltage conditioning unit which are connected in sequence; a voltage and current signal of the physical simulation circuit is converted into a low voltage or low current signal through a mutual inductor or a sensor, and is sent to the D/A hybrid interface device, the A/D data collector of the D/A hybrid interface device converts an analog signal into a digital signal, and the data buffer of the data acquisition unit temporarily caches the digital signal;

the power amplification unit includes a D/A converter and power amplifier which are connected in sequence; a signal of the digital simulation system passes the D/A converter at first, a digital current signal of the digital simulation system is converted into an analog voltage signal, and the analog voltage signal is converted into a current corresponding to a digital quantity through the current power amplifier; and the switch signal unit adopts an isolation device for isolation, and the switch signal unit has functions of: 1) directly transmitting a switch instruction of the digital simulation system to the physical simulation circuit for execution, and 2) sending a switch state of the physical simulation circuit to a digital part of an upper computer.

In an embodiment, the FPGA-based time adjustment technology is adopted to achieve a purpose of real-time synchronization of the digital simulation system and the physical simulation circuit, and the FPGA-based time adjustment technology is as follows: a high-speed FPGA records a reading signal of the digital simulation system, records a calculation cycle time of the digital system according to the reading signal, and punctually drives an A/D signal converter at a time point $\Delta T$ before next reading of the digital simulation system to perform A/D conversion on analog data and provide A/D conversion result for the digital simulation system.

In an embodiment, the physical simulation circuit is configured to implement analog simulation of a multi-voltage class power distribution network, and includes a power simulation unit, a line simulation unit, a load simulation unit, a protection simulation unit, a monitoring simulation unit and a physical synchronization module; and a power distribution network type object which may be simulated by the physical simulation circuit includes a single-voltage class or multi-voltage class passive power distribution network, active power distribution network, closed-loop running power distribution network and AC and DC hybrid power distribution network.

In an embodiment, a terminal cabinet is designed for the physical simulation circuit, terminals in the terminal cabinet are connected with connecting ports of power physical components, and the terminal cabinet is drawn with each component marking symbol and pasted with names and connecting port numbers.

In an embodiment, a uniquely corresponding model is designed for each power physical component, lines are drawn for connection according to a model structure to be designed, and the upper computer automatically recognizes a connecting relationship between the components, and generates a connecting list, the connecting list including a sequence number of each component, port numbers of the components and a connecting relationship between ports of the components.

In an embodiment, a process that the upper computer automatically generates the connecting list according to a topological relationship between the power physical components is implemented as follows: the upper computer traverses all the components in a sequence from small to large sequence numbers of the power physical components and traverses all the ports of the components in a sequence from small to large port numbers to form the connecting list, and records the component sequence numbers and port numbers which are traversed for the first time as primary component sequence numbers and port numbers of new nodes.

In an embodiment, simulation functions of the multi-time-scale D/A hybrid simulation system for the complex power distribution network include that: 1) the physical simulation circuit monitors the digital simulation system: model real-time power flow running state simulation is completely performed in the digital simulation system, a monitoring and protection device of the physical simulation circuit monitors a running state of the digital simulation system, and if an event or failure occurs at a certain moment when the digital simulation system runs, the real monitoring and protection device of the physical simulation circuit timely acts according to the event or the failure, and sends an acting signal to the digital simulation system through the D/A hybrid interface device to achieve a purpose of testing the monitoring and protection device of the physical simulation circuit; 2) the digital simulation system monitors the physical simulation circuit: the physical simulation circuit constructs a simulation topology according to a given scenario, its running state is sent to the digital simulation system through the D/A hybrid interface device, and a monitoring and protection module of the digital simulation system monitors a real running state of physical simulation to achieve a purpose of monitoring the physical simulation circuit by the digital simulation system; and 3) D/A hybrid simulation with respective digital transient and steady calculation of the complex power distribution network: the system is divided into a simulation computer calculating a power grid model of the complex power distribution network and a real-time simulator configured to calculate electronic transient and electromagnetic transient models, two systems are connected by high-speed communication, and the real-time simulation system is connected with the physical simulation circuit through the power amplifier.

In order to solve the technical problems, another aspect of the embodiments of the disclosure further provides a simulation method of a multi-time-scale D/A hybrid simulation system for a complex power distribution network, which is improved as follows: the simulation method includes the following scenarios: (1) D/A hybrid simulation of the complex power distribution network running in a digital simulation system; (2) D/A hybrid simulation of a part of the complex power distribution network running in a physical simulation equipment; and (3) D/A hybrid simulation in which digital transient calculation and steady calculation of the complex power distribution network are performed respectively, wherein based on the above three basic forms, modules in the digital simulation system and the physical simulation circuit all run independently, the digital simulation system wholly or partially participates in D/A hybrid simulation of the physical simulation circuit, and all or part of equipment of the physical simulation circuit participates in D/A hybrid simulation of the digital simulation system.

In order to solve the technical problems, another aspect of the embodiments of the disclosure provides a computer storage medium, wherein the computer storage medium stores a computer-executable instruction, and the computer-executable instruction is configured to execute the simulation method of the multi-time-scale D/A hybrid simulation system for the complex power distribution network.

Compared with a closest conventional art, the technical solutions provided by the embodiments of the disclosure have the following beneficial effects.

(1) The multi-time-scale D/A hybrid simulation system and simulation method therefor for the complex power distribution network and computer storage medium provided by the embodiments of the disclosure may implement multi-time-scale real-time simulation of a large-scale complex power distribution network, and are high in simulation real-time performance, accuracy and stability.

(2) The multi-time-scale D/A hybrid simulation system and simulation method therefor for the complex power distribution network and computer storage medium provided by the embodiments of the disclosure simulate equipment difficult to accurately model with physical model equipment and digitally simulate other parts to implement synchronization between D/A multi-time-scale simulation, and are real-time, efficient, convenient and also accurate.

(3) According to the embodiments of the disclosure, a steady multi-time-scale simulation test in the complex power distribution network including a conventional power distribution network and new elements such as the distributed power supply, a microgrid, an electric vehicle/charging and discharging device, intelligent equipment/system, an automatic/information-based system, a DC power grid, an AC and DC hybrid power grid, a closed-loop running power grid and a power electronic inversion device may be implemented.

(4) According to the embodiments of the disclosure, comprehensive simulation functions are realized, including simulation functions of failures of power distribution networks with different topologies and different grounding manners, dynamic and static power flows and the like, and simulation analysis on a single or multi-voltage grade power distribution network with infinite power or isolated for running may be implemented.

(5) According to the embodiments of the disclosure, a simulation result is repeatable, reliable and real, and may objectively reflect a running rule and characteristic of a real complex power distribution network.

(6) According to the embodiments of the disclosure, a cutting-edge technology and mature and reliable equipment are adopted, the simulation system is easy to implement, a modular design is adopted, a topological changing manner is flexible, and convenience is brought to operations.

(7) According to the multi-time-scale D/A hybrid simulation system and simulation method therefor for the complex power distribution network and computer storage medium provided by the embodiments of the disclosure, the digital part is implemented by adopting multi-Central Processing Unit (CPU)-based parallel distributed simulation and FPGA-based small-step length digital simulation, the analog part implements simulation through the physical model equipment, and a D/A hybrid interface formed by the data acquisition unit, the current power amplification unit and the switch signal unit is adopted for connection, so that practical running time of a digital simulation process and an analog system is kept consistent, a simulation speed is high, and it is maximally ensured that multi-time-scale simulation is close to a real running condition.

DETAILED DESCRIPTION

Figure 1:
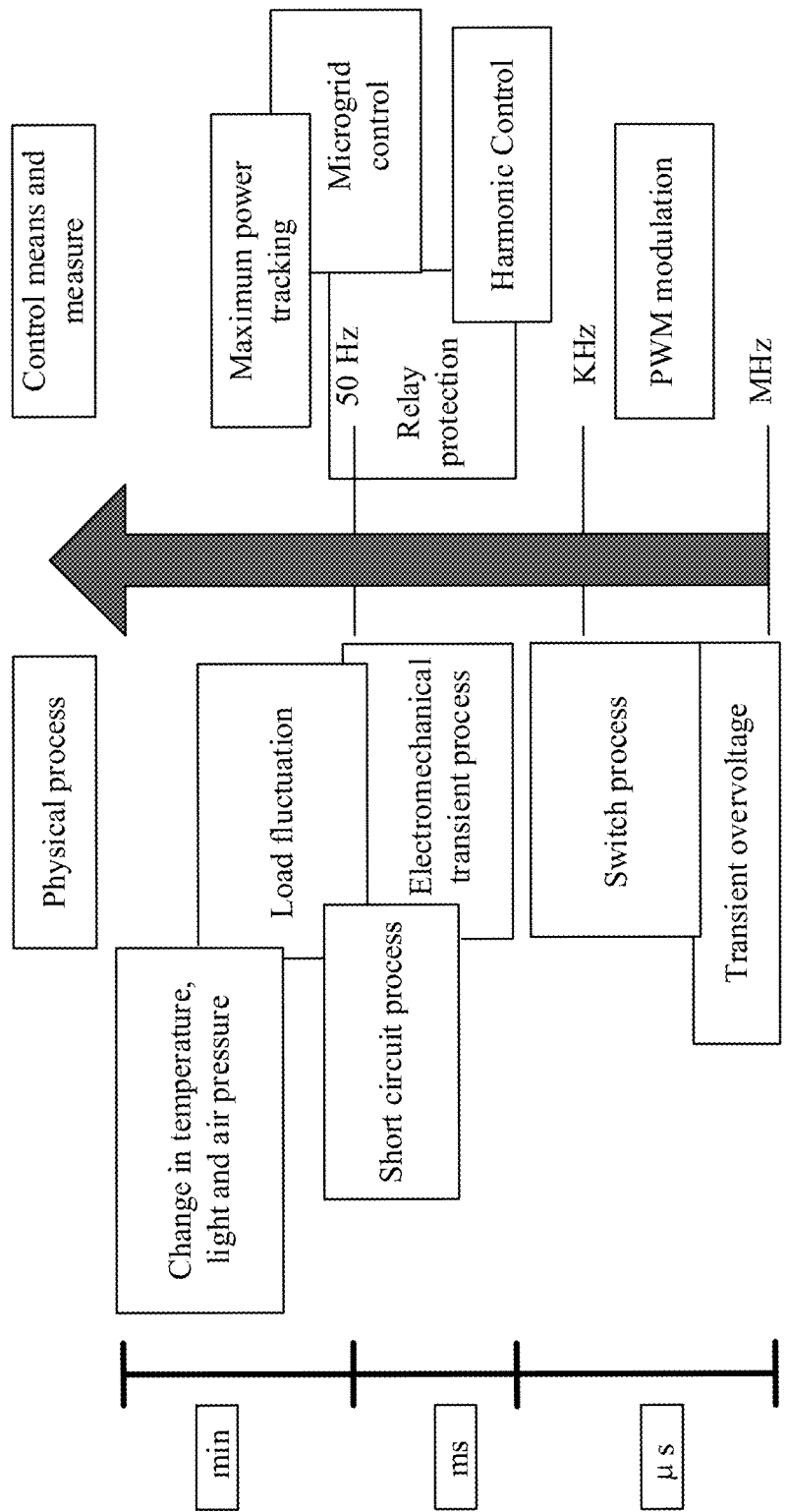
FIG. 1 is a schematic diagram of a time scale of various dynamic processes of a complex power distribution network.

Specific implementation modes of the disclosure will further be described below in conjunction with the drawings in detail. It is to be understood that the scope of protection of the disclosure is not limited by the specific implementation modes.

Specific implementation solutions of the disclosure are fully shown in the following descriptions and drawings for those skilled in the art to implement. Other implementation solutions may include structural, logical, electrical, process and other changes. Embodiments only represent possible changes. Unless explicitly specified, independent components and functions are optional, and an operation sequence may change. Part and characteristics of some implementation solutions may be included in or replace part and characteristics of the other implementation solutions. The scope of the implementation solutions of the disclosure includes the whole scope of the claims and all achievable equivalents of the claims. In the disclosure, these implementation solutions of the disclosure may be independently or wholly represented with term "disclosure", just for convenience. Moreover, if more than one disclosure is actually disclosed, the scope of the application will not be automatically limited to be any single disclosure or inventive concept.

The disclosure discloses a multi-time-scale D/A hybrid simulation system for a complex power distribution network and simulation method for the multi-time-scale D/A hybrid simulation system and a computer storage medium. The method adopts multi-time-scale digital and multi-time-scale real-time simulation for a conventional power distribution network unit part, and performs simulation by adopting physical model equipment for equipment and network of which internal mechanisms have yet not been deeply researched and are difficult to express with digital formulae and model and high in simulation accuracy. A digital part and an analog part implement joint real-time simulation through a D/A hybrid interface unit and a synchronization mechanism. Three major parts which are involved will be described below in detail respectively.

(1) A digital side part in D/A hybrid simulation of the complex power distribution network 1) For multi-time-scale simulation of a power distribution network including a distributed power supply, a simulation step length is required to be small, particularly for multi-time-scale simulation of a power electronic interface distributed power supply including a high-frequency switch signal. In the disclosure, an FPGA-based simulation technology is adopted. Hardware acceleration is implemented on a underlying layer by using a programmable logical resource of an FPGA, and the simulation step length may be smaller than 5 μs.

2) A simulation calculation amount is increased because of the small simulation step length. For ensuring real-time synchrony between a simulation speed and an external physical simulation device, a model decomposition technology is internally adopted to optimally divide a digital model of the power distribution network, feeder lines, substations and feeder lines thereof, a power supply region formed by a plurality of substations and the whole power distribution system are taken as a simulation object for digital segmentation. The segmentation process may be implemented according to principles of balance between complexity and the calculation amount, problem research requirements and the like. And segmented partition modules may adopt a multi-CPU blocking calculation method for high-speed parallel calculation and acceleration. When the simulation model is split from different angles, a running state and simulation result of the simulation model are different, synchronization of CPUs where different models are located directly influences a simulation effect, and a delay of a power interface may also influence simulation, so that detailed considerations and design are made in the disclosure for simulation synchronization problems.

3) For implementing multi-time-scale simulation of the complex power distribution network, it is necessary to perform multi-time-scale modeling on equipment components of the power distribution network. Multi-time-scale models of the equipment components of the complex power distribution network are established according to internal mechanisms of the equipment components of the complex power distribution network such as the distributed power supply, a power electronic device and a charging pile and dynamic and static characteristics thereof in various response processes of the complex power distribution network, and a representation form includes a differential equation, a nonlinear algebraic equation, a piecewise linearization equation and the like.

(2) Physical model simulation: physical units with unclear running mechanisms, complex in modeling and difficult to express may be simulated with physical systems or equipment. Physical model simulation of the power distribution network refers simulating practically running equipment of the power distribution network on the basis of a similarity principle by adopting physical equipment practically used in reality or physical equipment which is equally scaled. According to a similarity theory, there exist fixed scale factors between static, dynamic and multi-time-scale physical quantities of a power distribution system and corresponding physical quantities of another power distribution system, and when two power distribution systems or equipment has certain similarities in terms of geometry, performance, structure, behavioral process and the like, characteristics of the other power distribution system or equipment of the same scale may be deduced from one power distribution system or equipment. Therefore, the performance of the practical physical equipment may be simulated with the physical model equipment which is equally scaled according to an economy principle. In the disclosure, equipment and system setting and performing physical multi-time-scale performance simulation includes 6 types of units, i.e., a power simulation unit, a line simulation unit, a load simulation unit, an event simulation unit, a protection simulation unit and a monitoring simulation unit. Device types and numbers of each simulation unit are determined according to a scale of the power grid to be simulated. Each unit is independent. During application, related devices of each unit are directly connected or nested to form a planned power grid topology according to equipment types requiring analog simulation, and device parameters and control strategies are adjusted to construct a required topological structure of a complex power distribution network.

Considering that an object required to be simulated includes a single-voltage class or multi-voltage class power distribution network type such as a conventional passive power distribution network, an active power distribution network, a closed-loop running power distribution network and an AC and DC hybrid power distribution network, an established analog simulation system for the complex power distribution network is also required to include the composition units of the abovementioned types as well as the topological structure and have the corresponding running characteristics. For such a characteristic, a modular analog simulation system, with the characteristics of flexible modeling, topology variability and controllability and parameter adjustability and controllability, for the complex power distribution network is constructed, the system is electrically isolated from a power supply network (i.e. a power grid), takes electricity from the power supply network through a power electronic inversion power supply, and internally forms an analog power system completely unrelated with and independent from the power grid in terms of frequency, voltage, current, time scale and the like, one or more voltages between a rated voltage 0-1,500V of the system may, for example, adopt three voltage classes, i.e. 1,100V, 400V and 100V, and a voltage of the constructed system may include one or more voltages. The power simulation unit simulates an AC synchronous power generation system, a power grid with AC infinite power/superior to the power distribution network and various power supplies of the power distribution network such as a distributed power supply and an AC power supply. The line simulation unit simulates equivalent impedance of a substation, a switch, a feeder line, a transformer and the like. The load simulation unit simulates an active and reactive AC loads and DC loads, which are stable or change according to a certain rule, of each voltage class. The event simulation unit simulates an event of an interphase short circuit, a grounded short circuit, an open circuit, a risk, tripping, load switching and the like and a failure and action of device equipment to be tested. The protection simulation unit simulates a relay protection and setting strategy of the power distribution network. The monitoring simulation unit simulates a monitoring, communication and control system, Supervisory Control And Data Acquisition (SCADA) system and the like of the power distribution network, and acquires and simulates electricity utilization information acquisition, load management, line loss analysis, load prediction, electricity pricing strategy and the like of the power distribution network.

The physical analog simulation system inevitably needs to change the topological structure according to a requirement. For the shortcomings of the conventional arts, the embodiments of the disclosure provide a topological implementation method of a physical analog simulation system for a power distribution network. Multiple required topological structures are provided for simulation of the power distribution network. According to a number and changing characteristics of changing nodes in topologies, upper computer software automatically generates a connecting solution, generates a connecting list, and connects each end of components in a terminal cabinet according to the list.

(3) A D/A hybrid interface and synchronization technology: for forming hardware-in-the-loop digital and physical hybrid co-simulation, the D/A hybrid interface is required to be used. The D/A hybrid interface has a main function of synchronization for running data coordination and time consistency, acquires and converts voltage, current and switch information acquired from a physical side for sending to a digital side, and sends digital information of the digital side to an analog side through a current power amplifier for real-time running, so as to ensure real-time simulation of a digital software simulation system and physical analog side simulation on the same time section.

The D/A hybrid interface mainly includes three parts, i.e., a data acquisition unit, a power amplification unit and a switch signal unit. The data acquisition unit is responsible for acquiring and sending a voltage, current and switch signal of the physical simulation circuit to the digital simulation system. The power amplification unit mainly implements power amplification of a current signal of a digital simulation system part, and converts a digital signal into a real voltage, current and switch signal for participating in running of the simulation circuit. The switch signal unit implements isolated sending of the switch signal between the digital system and the physical simulation equipment.

The multi-time-scale D/A hybrid simulation system for the complex power distribution network needs real-time synchronization between a digital part and an analog part and between the digital part. The real-time synchronization technology is implemented from three aspects. A digital part implementation method includes: a variable step length technology and a distributed data sharing technology. Real-time synchronization between the digital parts and the analog part is implemented through the D/A hybrid interface, and an implementation method is an FPGA-based time adjustment strategy.

Embodiment

Figure 2:
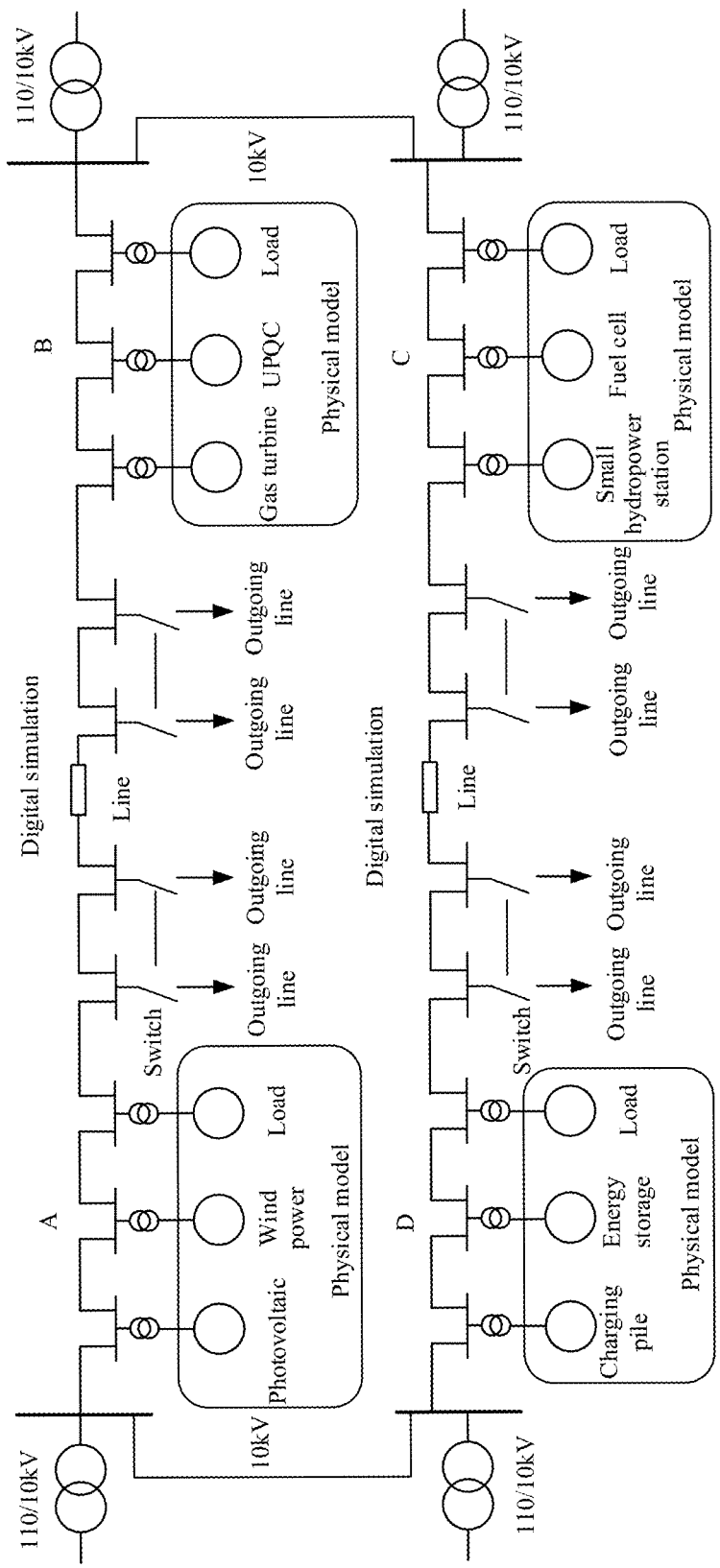
FIG. 2 is a schematic diagram of a specific embodiment of a multi-time-scale D/A hybrid simulation system and simulation method therefor for a complex power distribution network according to an embodiment of the disclosure.

FIG. 2 is a schematic diagram of a specific embodiment of a multi-time-scale D/A hybrid simulation system and simulation method therefor for a complex power distribution network according to the disclosure. In FIG. 2, with a 10 kV power distribution network as an example, a basic idea of the multi-time-scale D/A hybrid simulation system and simulation method therefor for the complex power distribution network are shown. A large-scale complex power distribution network part in the figure adopts digital simulation, including a connecting line part, a switch, outgoing lines and the like. Units of wind power generation, photovoltaic power generation, a charging pile, energy storage, a load and the like, shown in dotted boxes in the figure, which are relatively more complex, unlikely to be modeled and high in simulation accuracy requirement are simulated with scaled physical model equipment.

Figure 3:
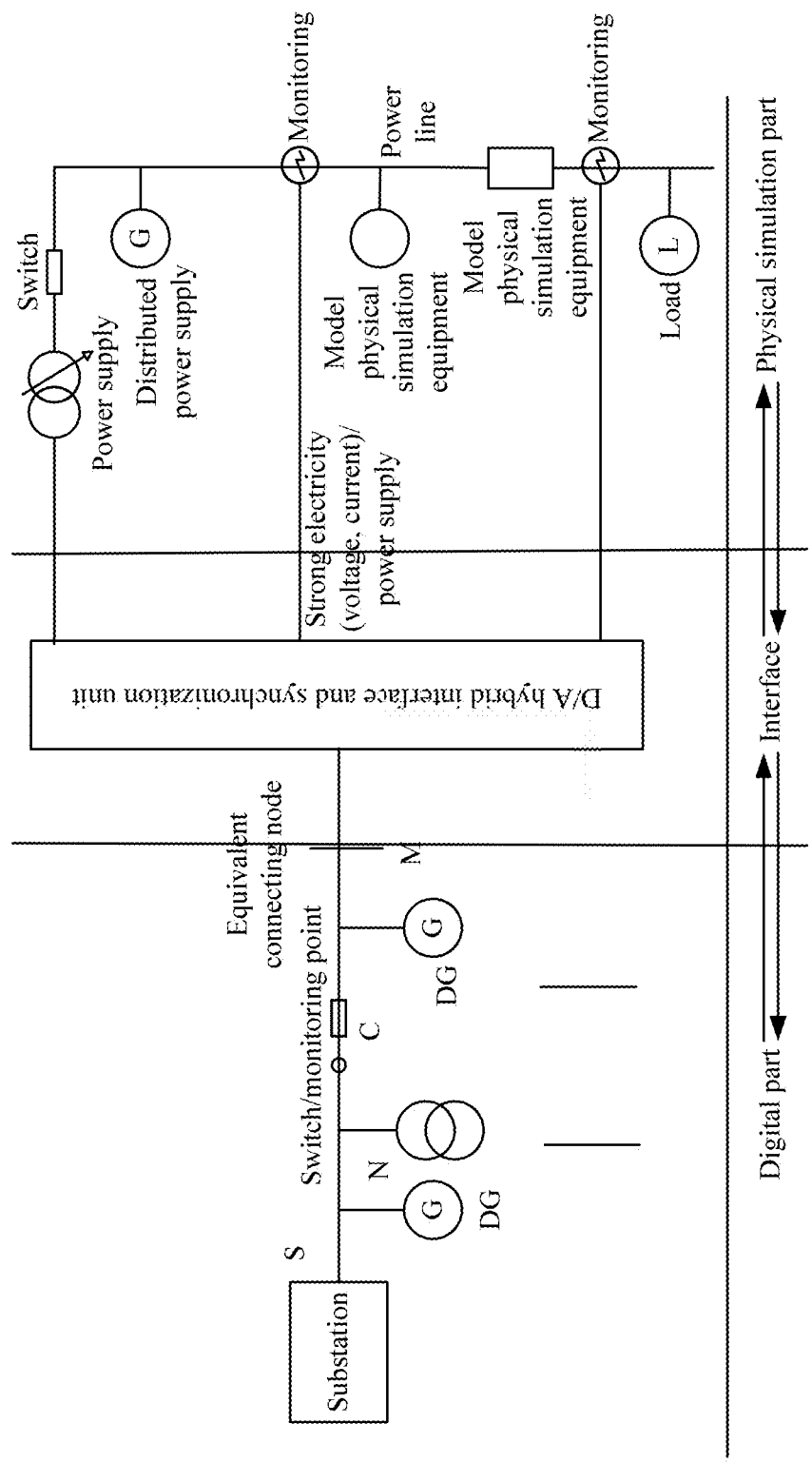
FIG. 3 is a principle diagram of a multi-time-scale D/A hybrid simulation system and simulation method therefor for a complex power distribution network according to an embodiment of the disclosure.

FIG. 3 is a principle diagram of a multi-time-scale D/A hybrid simulation system and simulation method therefor for a complex power distribution network according to the disclosure. A digital simulation part and physical model simulation part of the complex power distribution network are connected through a D/A hybrid interface and synchronization unit. Digital simulation of a substation, the load, a distributed power supply, the switch, a monitoring point, an equivalent connecting point and the like is implemented in the digital part, and these modules are simulated by adopting conventional manure digital models. Alternatively, digital verification simulation is performed on novel equipment (for example, the distributed power supply). An analog simulation part of the complex power distribution network performs physical analog simulation on a power line, voltage adjustment equipment, the distributed power supply, the load and various kinds of physical model equipment. Compared with the digital part, physical analog simulation adopts a high voltage and a high current, and is connected with the digital part through the D/A hybrid interface and synchronization unit. The D/A hybrid interface and synchronization unit amplifies a voltage and current signal of the digital part into a real high voltage and high current in an equal proportion for connection with a physical model simulation system. On the contrary, a high voltage and high current signal of the physical model simulation system is also converted into a digital voltage and digital current signal for connection with digital simulation in an equal proportion through the D/A hybrid interface and synchronization unit. Therefore, real-time multi-time-scale D/A hybrid simulation of the complex power distribution network is implemented.

Figure 4:
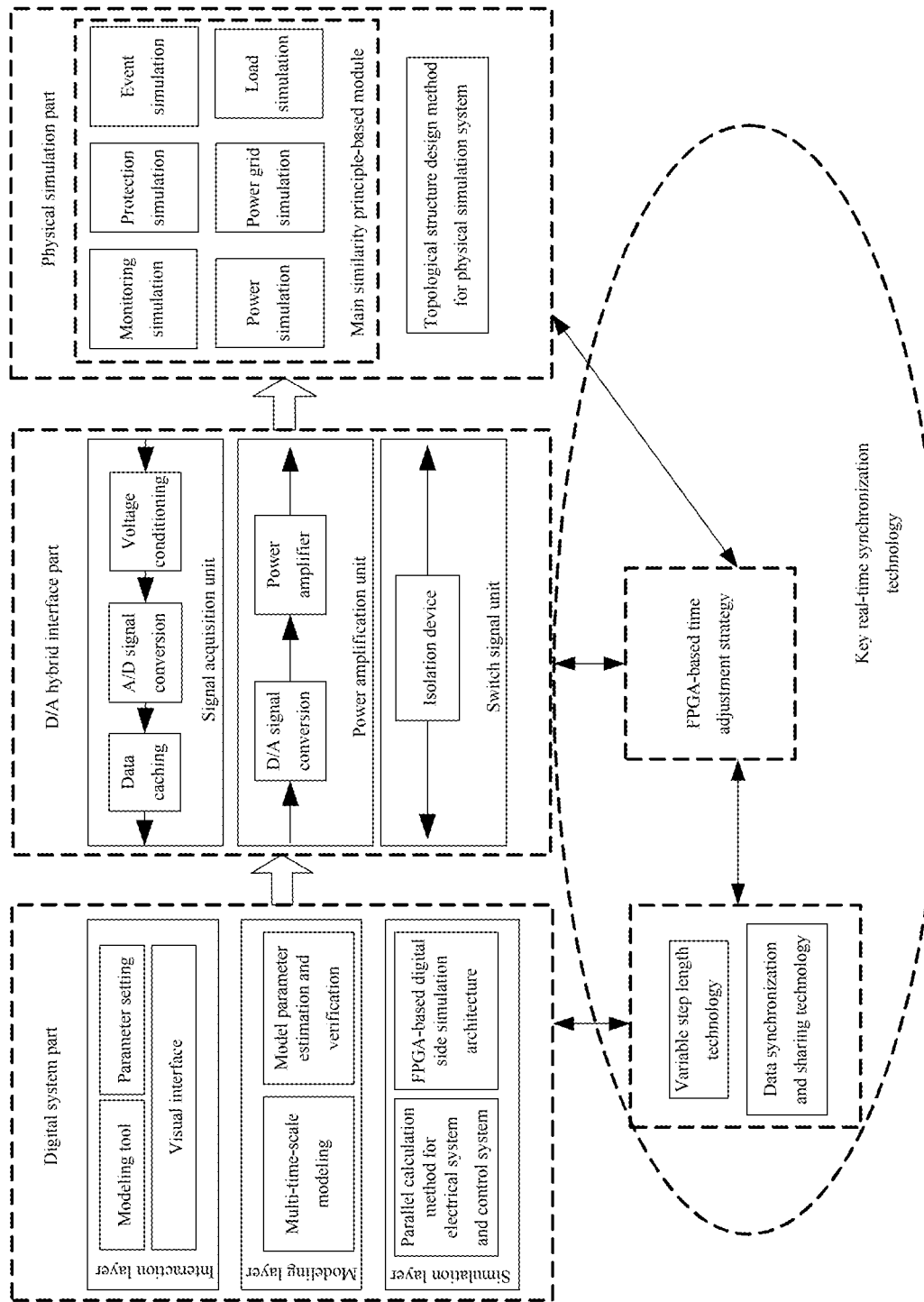
FIG. 4 is an overall structure diagram of a multi-time-scale D/A hybrid simulation system for a complex power distribution network according to an embodiment of the disclosure.

1: An Overall Structure of a D/A Hybrid Simulation System for a Complex Power Distribution Network The overall structure of the D/A hybrid simulation system for the complex power distribution network is shown in FIG. 4. The overall structure includes a digital system part, a D/A hybrid interface part and a physical simulation part.

The digital system part includes: design of an interaction layer, design of a modeling layer and design of a simulation layer. The design of the interaction layer includes design of a modeling tool, parameter setting and a visual interface. The design of the modeling layer includes multi-time-scale modeling and model parameter estimation and verification. The design of the simulation layer includes design of a parallel calculation method for an electrical system and a control system and design of an FPGA-based digital side simulation architecture, and is a foundation for parallel decomposition-coordination simulation. Design work of the three aspects determines an overall architecture of upper computer software.

A D/A hybrid interface mainly includes three parts, i.e., a signal amplification unit, a power amplification unit and a switch signal unit. The signal acquisition unit is responsible for acquiring and sending a voltage and current signal of a physical simulation circuit to a digital simulation system. The power amplification unit mainly implements power amplification of a current signal of a digital simulation system part, and converts a digital signal into a real current signal for participating in running of a simulation circuit. The switch signal unit implements isolated sending of a switch signal between the digital system and physical simulation equipment.

The physical simulation part mainly includes: a power simulation unit, a line simulation unit, an event simulation unit, a load simulation unit, a protection simulation unit, a monitoring simulation unit and the like. Each unit is independent. During application, related devices of each unit are directly connected or nested to form a planned power grid topology according to equipment types involved in similarity principle-based analog simulation, and device parameters and control strategies are adjusted to construct a required topological structure of a complex power distribution network.

Figure 5:
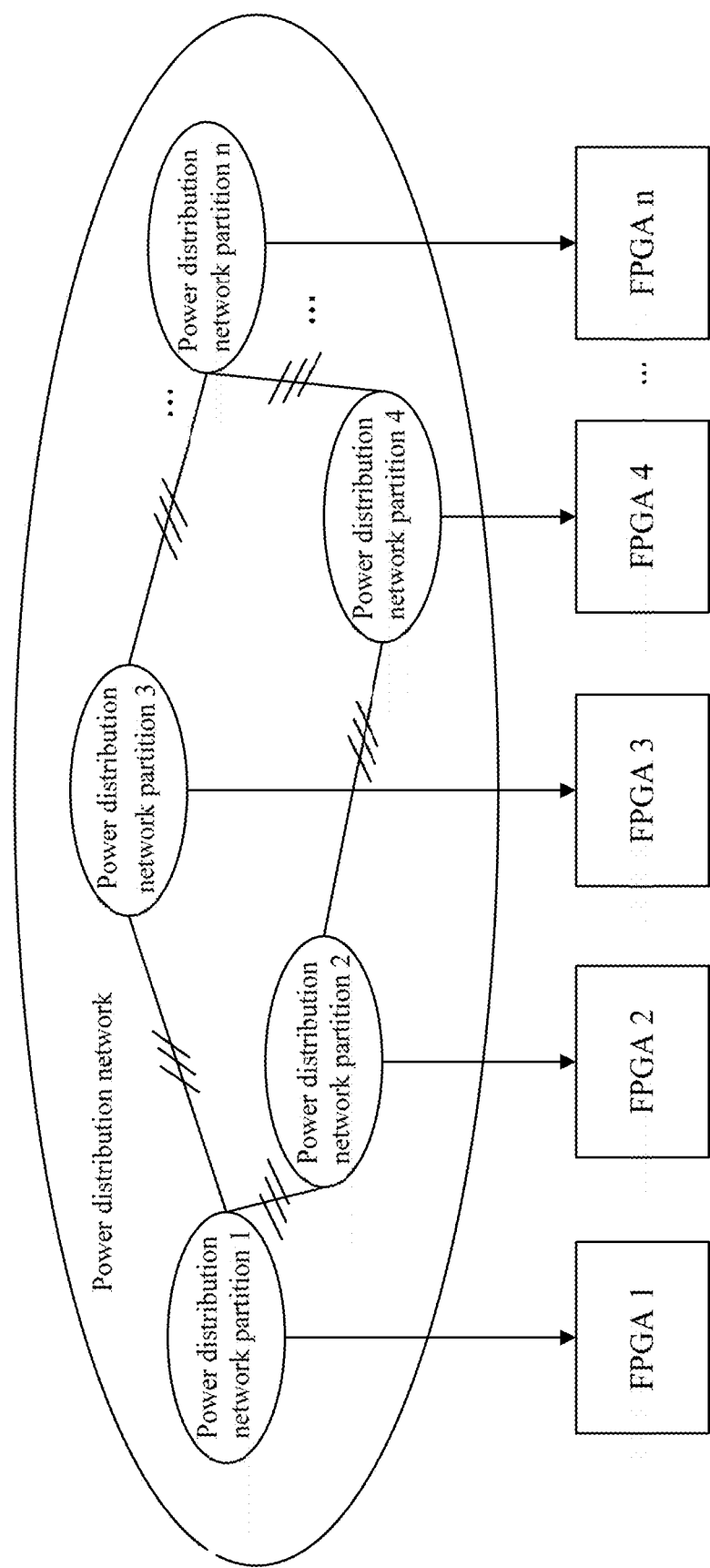
FIG. 5 is a principle diagram of an FPGA-based small-step length digital transient simulation part according to an embodiment of the disclosure.
Figure 6:
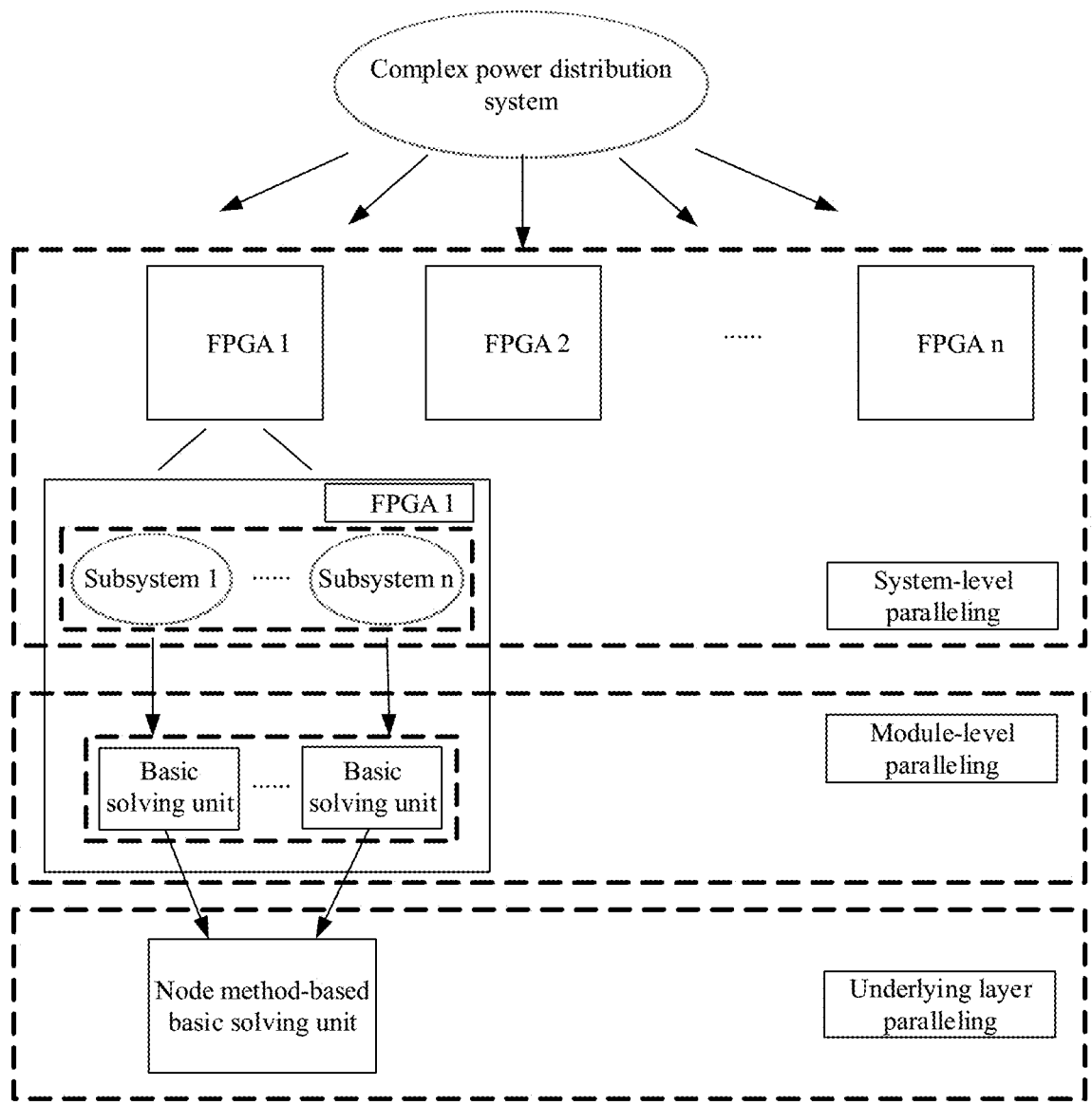
FIG. 6 is an architecture diagram of FPGA-based digital side simulation according to an embodiment of the disclosure.

2: A Digital Side Part in D/A Hybrid Simulation of the Complex Power Distribution Network (1) The FPGA-Based Digital Simulation Architecture Here, a principle of the digital simulation part is shown in FIG. 5, and adopts FPGA-based multi-time-scale digital real-time simulation. The power distribution network to be simulated is decomposed into a plurality of subnetworks. The subnetworks are connected through communication lines. Simulation of each subnetwork is operated in an FPGA-based basic solving unit. The result of each basic solving unit is shared through the communication lines to achieve a purpose of parallel simulation operation. Each FPGA is formed by a large number of basic programmable logical units, programmable Input/Output (I/O) ports and internal connecting lines, is assisted with an embedded block Random-Access Memory (RAM), an embedded hardcore and various Intellectual Property (IP) soft cores, has a completely configurable parallel hardware structure, distributed memory structure and streamline structure, and may implement high-speed numerical calculation. FPGA-based rapid multi-time-scale simulation adopts a node method as a frame of electromagnetic multi-time-scale simulation, and adopts a design architecture, shown in FIG. 6, of system-level paralleling, model-level paralleling and underlying-layer paralleling in combination with own characteristics of the FPGAs to increase a simulation speed, thereby implementing a rapid electromagnetic multi-scale-time simulation method.

1) System-Level Paralleling

System-level paralleling refers to adopting means of system segmentation, parallel solving, multi-rate solving and the like according to structure characteristics of the system to reduce a solving scale of a large-scale system as much as possible, increase a calculation speed, ensure simulation real-time performance and determine a basic allocation condition of the system on multiple FPGAs. Thereafter, system subdivision may be performed on multiple subsystems allocated on the FPGAs to further increase the calculation speed. Each subsystem may have an independent calculation resource, and thus a calculation resource of each FPGA may be fully utilized.

2) Module-Level Paralleling

Figure 7:
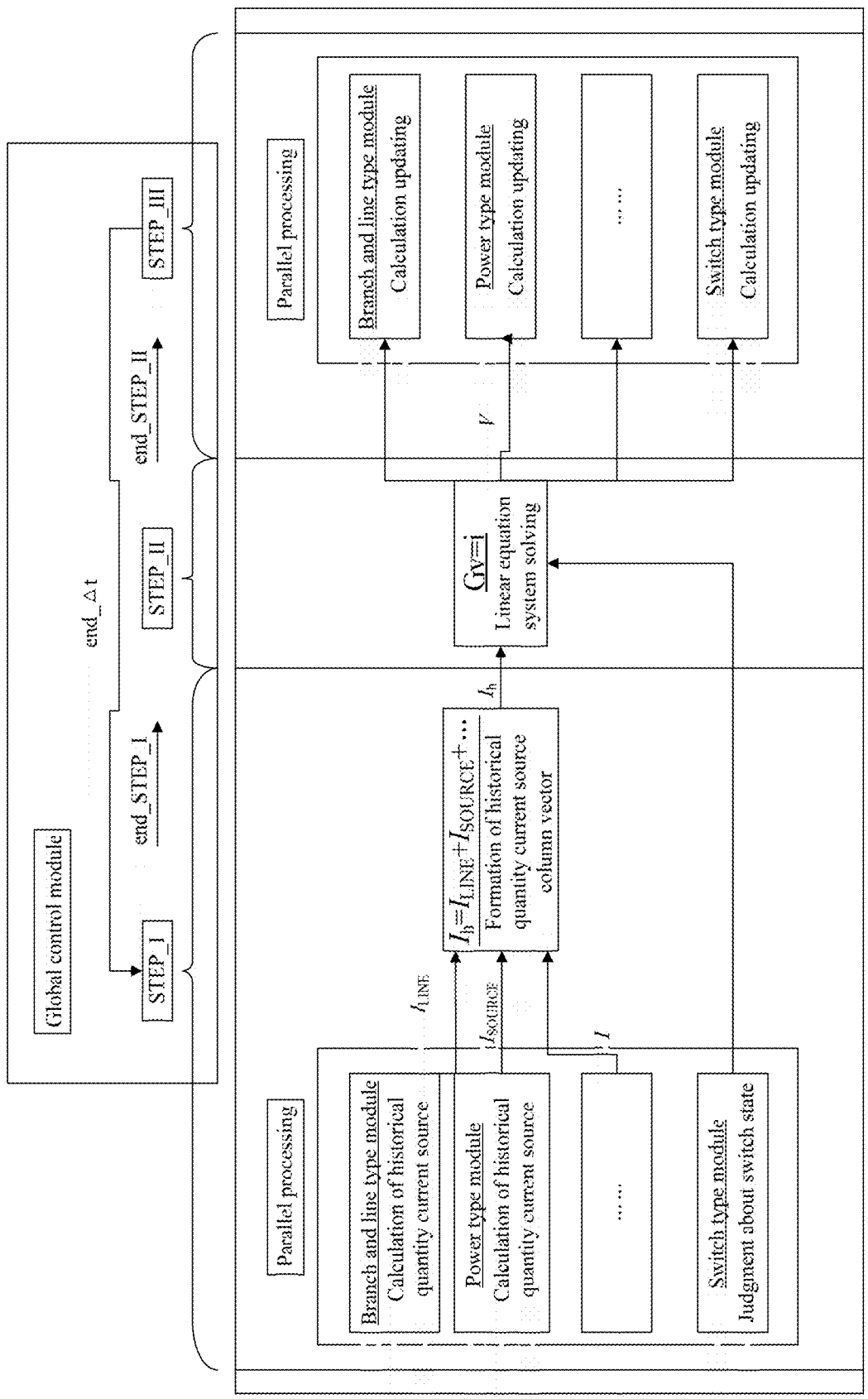
FIG. 7 is a solving frame diagram of digital simulation of a complex power distribution network according to an embodiment of the disclosure.

FIG. 7 shows a block diagram of a solving process of an FPGA-based basic solving unit. Each basic solving unit is formed by a plurality of hardware function modules. A node method-based solving flow may be divided into three parts. In STEP_I, a component type module is responsible for calculating a historical quantity current source, judging a switch state and generating a historical quantity current source column vector. In STEP_II, linear equation system solving is performed to calculate a node voltage. In STEP_III, a branch voltage and branch current of the component of each type are updated through the node voltage calculated in STEP_II for calculation of a next time step. As can be seen that the calculations of various component type modules in dotted box parts of STEP_I and STEP_III are completely independent, so that it is easy to implement concurrent processing.

3) Underlying-Layer Paralleling

Underlying-layer paralleling mainly refers to fully refining concurrent operations from basic underlying-layer operations of each module of the whole system. Underlying-layer paralleling may be involved in parallel processing of a complex operational formula on an algebraic operation layer and utilization of a distributed memory on a data read-write layer. In addition, a model decomposition technology is internally adopted to segment and divide a digital model of the power distribution network, feeder lines, substations and feeder lines thereof, a power supply region formed by a plurality of substations and the whole power distribution system are taken as a simulation object for small-step length real-time simulation segmentation, a segmentation process may be implemented according to principles of balance between complexity and a calculation amount and problem research requirements, and segmented partition modules may adopt a multi-FPGA blocking calculation method for system-level paralleling acceleration.

4) Electrical System and Control System Paralleling

Figure 8:
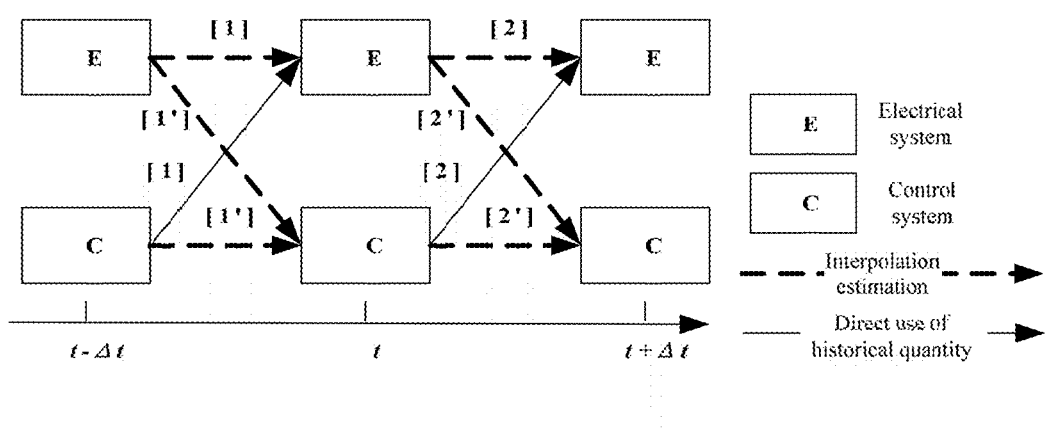
FIG. 8 is a diagram of a parallel calculation method for an electrical system and control system of a complex power distribution network according to an embodiment of the disclosure.

For ensuring real-time performance of the digital side in D/A hybrid simulation of the complex power distribution network, the embodiment of the disclosure adopts the parallel calculation method for the electrical system and control system of the complex power distribution network. On each step length, the electrical system may be integrated to the time step by using an output quantity of the control system on a previous time step, and meanwhile, the control system is integrated to the time step by directly using an output quantity of the electrical system on the previous time step. At this moment, there exists a step length delay for solving of the electrical system, and there also exists a delay for solving of the control system. For solving a simulation accuracy error brought by the step length delay, in the embodiment of the disclosure, for the control system, a predicted value obtained by numerical integration or interpolation over output of the electrical system on the previous time step is used as input on the time step, then the control system is integrated to the time step, and at this moment, since solving of the control system is also based on the output quantity of the electrical system on the previous time step, parallel solving of the electrical system and the control system may be implemented. For prediction of an electrical quantity, various explicit numerical integration methods may be used, and a linear or nonlinear interpolation algorithm may also be used. Such a parallel calculation strategy for the electrical and control systems may achieve calculation precision of a serial program. The whole calculation process is sequentially implemented according to a time sequence of [1]&[1']->[2]&[2'] shown in FIG. 8. In the figure, parallel solving may be implemented by Steps [1] and [1'] as well as [2] and [2'].

Figure 9:
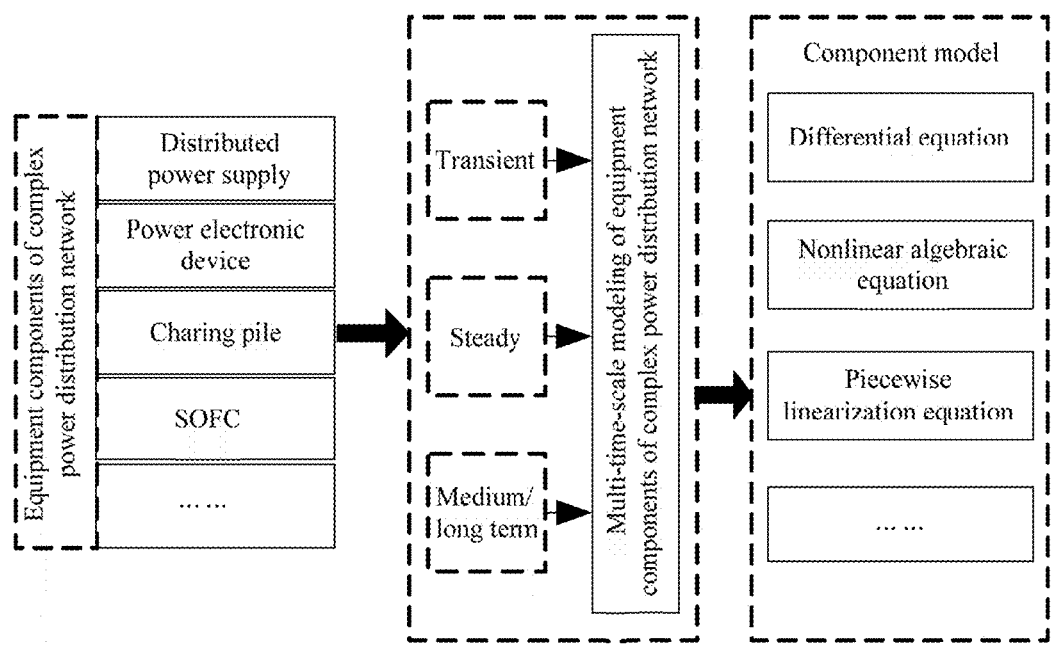
FIG. 9 is a technical diagram of a multi-time-scale modeling method for equipment components of a complex power distribution network according to an embodiment of the disclosure.

(2) Multi-Time-Scale Modeling of Equipment Components of the Complex Power Distribution Network A multi-time-scale modeling method for the equipment components of the complex power distribution network is shown in FIG. 9. Multi-time-scale modeling requirements of the equipment components of the complex power distribution network are formed according to internal mechanisms of the equipment components of the complex power distribution network such as the distributed power supply, energy storage and a power electronic device (for example: an electric vehicle charging pile) and dynamic or static characteristics thereof in various response processes of the complex power distribution network, models, divided according to required time scales, of the equipment component of the complex power distribution network are established, and a representation form includes a differential equation, a nonlinear algebraic equation, a piecewise linearization equation and the like. In a practical modeling process, required dynamic processes may be selected for different simulation purposes and application scenarios to achieve better balance of the models between accuracy and complexity.

(3) A Real-Time Synchronization Technology

The multi-time-scale D/A hybrid simulation system for the complex power distribution network needs real-time synchronization between the digital simulation system and the physical simulation circuit and between the digital simulation systems. The real-time synchronization technology is implemented through three aspects.

1) A Variable Step Length Technology

The embodiment of the disclosure discloses a variable step length electromagnetic multi-time-scale simulation method. A variable step length electromagnetic multi-time-scale simulation method considering multiple switch actions is taken as an example. A switch action moment is acquired by using a linear interpolation technology, a backward-euler method in which programming is easier to implement is adopted, and after a switch action, a various step length backward-euler method is continuously used for trial integration and elimination of numerical oscillation. The method has a capability of processing the multiple switch actions and suppressing the numerical oscillation, and is also better adapted to simulation step lengths. Its basic principle is as follows: when a switch action occurs during simulation of the system on a certain step, a system solution of a switch action moment is solved by using the linear interpolation technology at first, and a correct system state is solved by twice trial integration with the variable step length backward-euler method; and then, the numerical oscillation is suppressed by continuously utilizing the variable step length backward-euler method twice during simulation on a next step.

Figure 10:
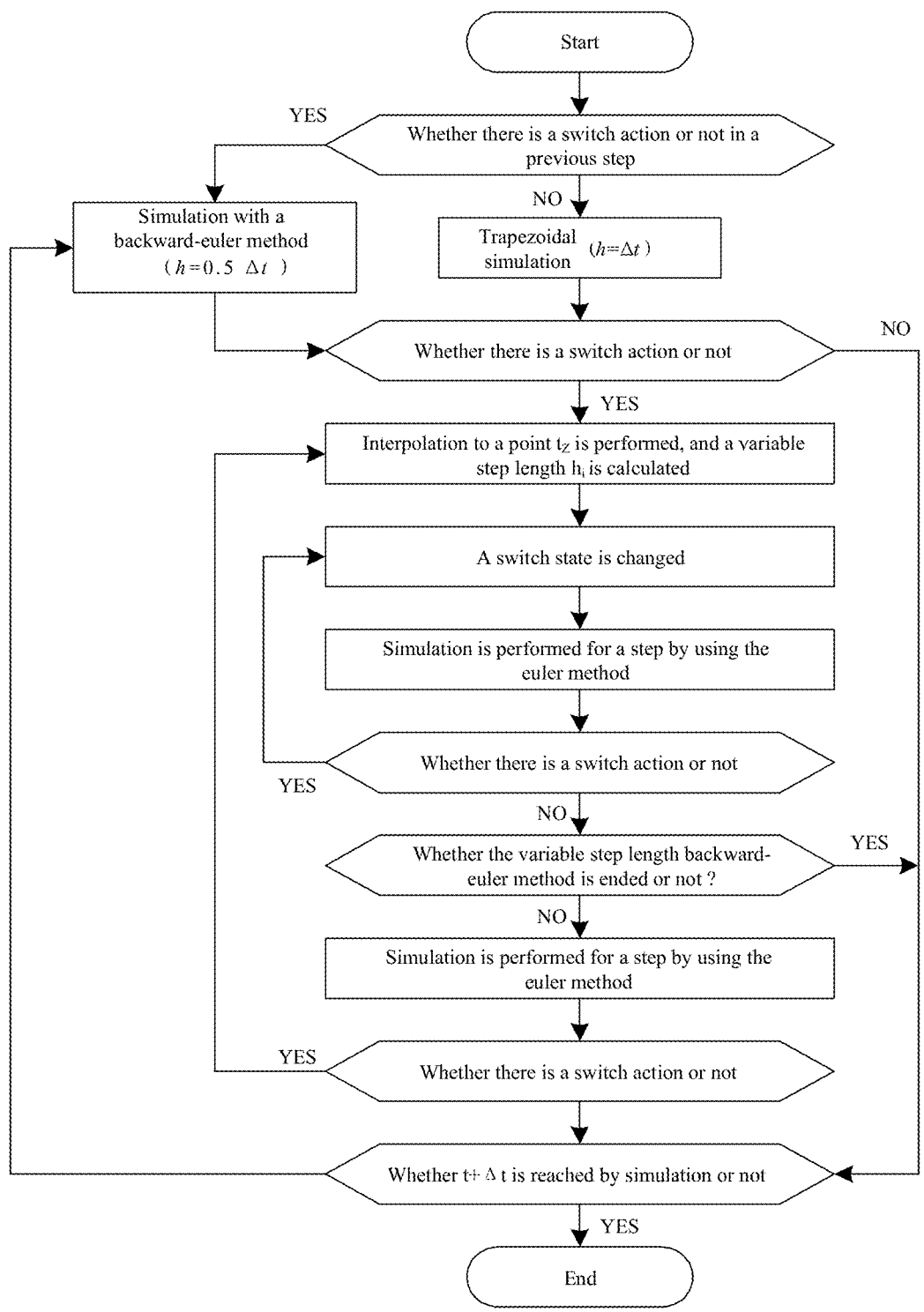
FIG. 10 is a flowchart of a variable step length simulation algorithm according to an embodiment of the disclosure.

FIG. 10 is a flowchart of a variable step length simulation algorithm considering multiple switch actions. The multiple switch actions occur in a half step length $0.5 \Delta t$, that is, the actions occur in a numerical oscillation suppression process. According to different switch action conditions, the embodiment of the disclosure discloses the variable step length simulation algorithm considering the multiple switch actions. The method includes the following simulation steps.

1) First switch action time $t_{zi}$ is detected in an integration process from a moment t to a moment $t+\Delta t$; 2) linear interpolation to a time-domain solution $X(t_{zi})$ of the switch action moment $t_{zi}$ is performed, and a variable step length value $h_i=0.5(t+\Delta t-t_{zi})$ of the backward-euler method is calculated; 3) a switch state is changed, a node admittance matrix is modified, trial integration is performed once by adopting the variable step length backward-euler method, and if a switch action occurs, the switch state is changed for reintegration until there is no more switch action; 4) forward integration is performed by adopting the backward-euler method, Step 7) is executed if no switch action is detected, otherwise Step 5) is executed; 5) linear interpolation to the time-domain solution $X(t_{zi})$ of the switch action moment $t_{zi}$ is performed, and the variable step length value $h_i=t+\Delta t-t_{zi}$ of the backward-euler method is calculated; 6) forward trial integration is performed by adopting the backward-euler method, and if a switch action occurs, the switch state is changed for reintegration until there is no more switch action; 7) simulation is performed twice by continuously adopting a half step length ($h=0.5 \Delta t$) backward-euler method, and if another switch action occurs, Step 2) is re-executed; and (8) in a fixed step length stage ($h=\Delta t$), simulation is continued by adopting a high-stability implicit trapezoidal integration method.

Here, the time-domain system solution $X(t_{zi})$ of the switch action moment $t_{zi}$ is calculated in Steps 2) and 4) by adopting the linear interpolation technology through a formula:

$$X(t_{zi}) = X(t) + \frac{t_{zi}-t}{h}[X(t+h)-X(t)]$$

where h represents the simulation step length, and X(t) and X(t+h) represent time-domain system solutions of moments t and t+h respectively.

In the flow of the simulation algorithm, whether there is a switch action on a previous step of the system or not is detected at first. If there is no switch action, the implicit trapezoidal method is adopted for forward simulation. If there is switch action, simulation is performed according to the backward-euler method in the algorithm. If the switch action occurs at the end of a simulation moment, the switch action is processed at the beginning of the next moment.

Figure 11:
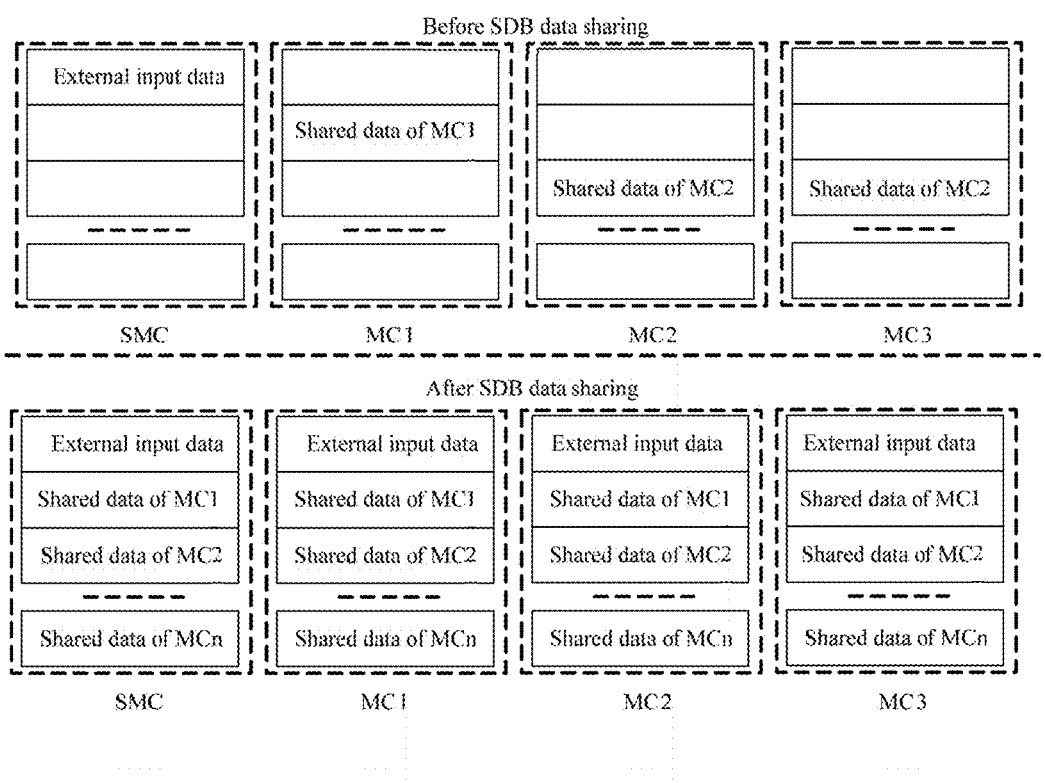
FIG. 11 is a state comparison diagram of a buffer of each processor before and after data sharing according to an embodiment of the disclosure.

2) A Data Synchronization and Sharing Technology During Parallel Calculation of the Complex Power Distribution Network D/A hybrid simulation of the complex power distribution network involves rapid parallel simulation calculation of the digital side and extremely short delay response of the physical side, a data volume is very large, and each module is required to be timely updated. FIG. 11 is a state comparison diagram of a buffer of each processor before and after data sharing. On the basis of characteristics of a memory data control algorithm, a system architecture and the overall structure, a single memory is divided into a plurality of blocks corresponding to different board cards on a bus respectively. Each Master Card (MC) may only perform a write operation on memory blocks consistent with its board card number in the memory, and may only perform a read operation on the other memory blocks. Each memory block is divided into a plurality of data blocks, and each data block may store data received from the bus in an Secure Digital Byte (SDB) cycle. A Hybrid Memory Cube (HMC) memory block is configured to store data transmitted from an external measurement system.

3) An FPGA-Based Time Adjustment Strategy

Figure 12:
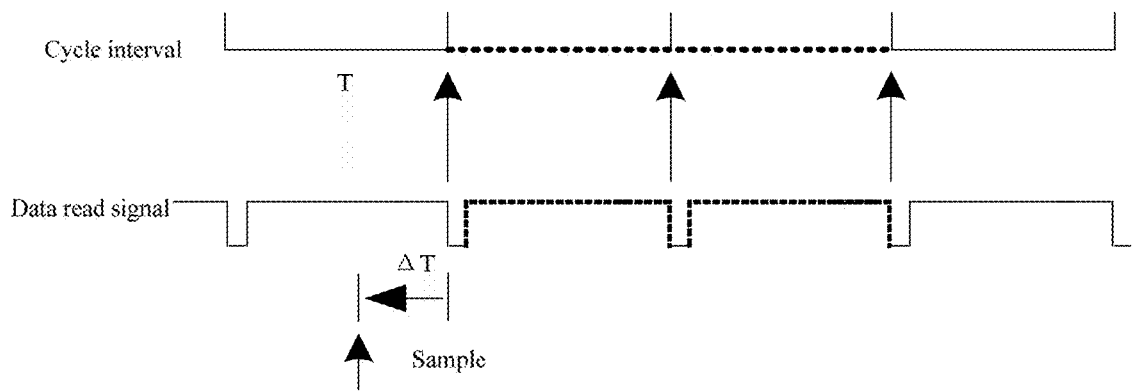
FIG. 12 is a diagram of an FPGA-based time adjustment strategy according to an embodiment of the disclosure.

In order to achieve a purpose of real-time synchronization between the digital part and the analog part, a reading moment of the digital part for real-time analog data is close to a waveform of analog part equipment as much as possible, and this requires the D/A hybrid simulation interface to have a coordination function. A conventional method is to adopt high-speed A/D signal converters, the FPGAs drive the A/D signal converters to read the real-time analog data in turn as rapidly as possible, and a data storage region is updated in real time. Such a method has the advantages that a logic is simple and it is ensured that data read by the digital system anytime is latest. However, it also has shortcomings: cost is higher if conversion speeds of the A/D signal converters are higher, and moreover, the FPGAs and the A/D signal converters frequently and repeatedly work to convert a large amount of useless data, which greatly increases comprehensive cost. The FPGA-based time adjustment strategy is shown in FIG. 12. For ensuring stability, the digital simulation system adopts operations with not so great changes in the step lengths, wherein a calculation cycle is considered to be fixed within a shorter time. For example, each calculation cycle time is T, real-time data reading time is also T, a high-speed FPGA records a reading signal of the digital simulation system, and records the calculation cycle time of the digital system according to the reading signal, the high-speed FPGA may record and accurately calculate that the cycle is T with a nanosecond-level error, and the high-speed FPGA records the time, and punctually drives the A/D signal converter at a certain time point $\Delta T$ before next reading of the digital system (a value of $\Delta T$ may be manually set) to perform A/D conversion on the analog data and provide A/D conversion result for the digital simulation system. In such a manner, time relationship quantification may be implemented, and working efficiency may be improved.

3: The Physical Simulation Circuit 2.1: System Voltage Class

The system includes one or more rated voltage classes, and during a practical application, one or more voltage classes may be adopted at the same time. For example, three voltage classes, i.e. 1,100V, 400V and 100V, may be adopted.

For a power distribution analog simulation system with two voltage classes existing at the same time, if, for example, two in 1,100V, 400V and 100V are adopted as voltage classes, a voltage is increased to be 1,100V by adopting a step-up transformer at an analog power supply, a 110 kV (or 220 kV) high-voltage power distribution network is simulated by using the 1,100V power supply, and 1,100V is decreased to be 400V or 100V by voltage decrease of a three-circuit transformer or a two-circuit transformer. A 35 kV power distribution network or medium-voltage power distribution network is simulated by using 400V, or a 10 kV medium-voltage power distribution network is simulated by using 100V, so as to realize a function of simulating two voltage classes. A 400V voltage may also be directly taken from a power electronic inverter power supply without any step-up transformer, and is converted into a 100V voltage through a step-down transformer, a 35 kV power grid or medium-voltage power distribution network is simulated by using 400V, and the medium-voltage or low-voltage power distribution network is simulated by using 100V.

2.2: Physical Equipment Composition (1) The Power Simulation Unit

The power simulation unit includes a power grid power simulation device, a distributed power simulation device and the like.

(a) The Power Grid Power Simulation Device

The power grid power simulation device is mainly formed by the power electronic inverter power supply, the step-up transformer and an energy storage device. The simulation system for the complex power distribution network includes at least one power grid power simulation device.

Figure 13:
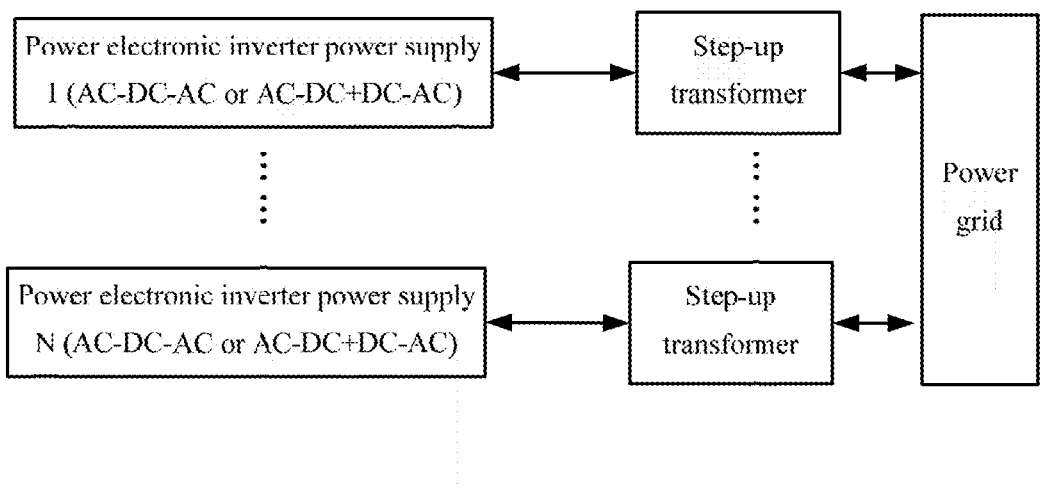
FIG. 13 is a structure diagram of a power grid power simulation device according to an embodiment of the disclosure.

There are two types of power electronic inverter power supplies. During the practical application, the two types may be adopted at the same time, or only one of them may be adopted. The first type takes electricity from a power supply network to supply power to the simulation system in an AC-DC-AC conversion manner, and the power electronic inverter power supply of the second type is formed by an AC-DC inversion device and a DC-AC inversion device. A structure diagram of the power grid power simulation device is shown in FIG. 13.

(b) The Distributed Power Simulation Device

The distributed power simulation device adopts two implementation manners, and one or both two of them may be adopted in the same system.

The first manner is a unified mode, that is, the power electronic inverter power supply accesses the power supply network, takes electricity from the power supply network in the AC-DC-AC conversion manner, and then simulates different types of distributed power supplies to supply power to the simulation system according to a given control method. Here, photovoltaic, photothermal and wind power generation may adopt a constant voltage, constant current or power control mode, and a gas turbine may adopt a synchronous motor control manner to simulate power and frequency response characteristics of a synchronous motor.

Figure 14:
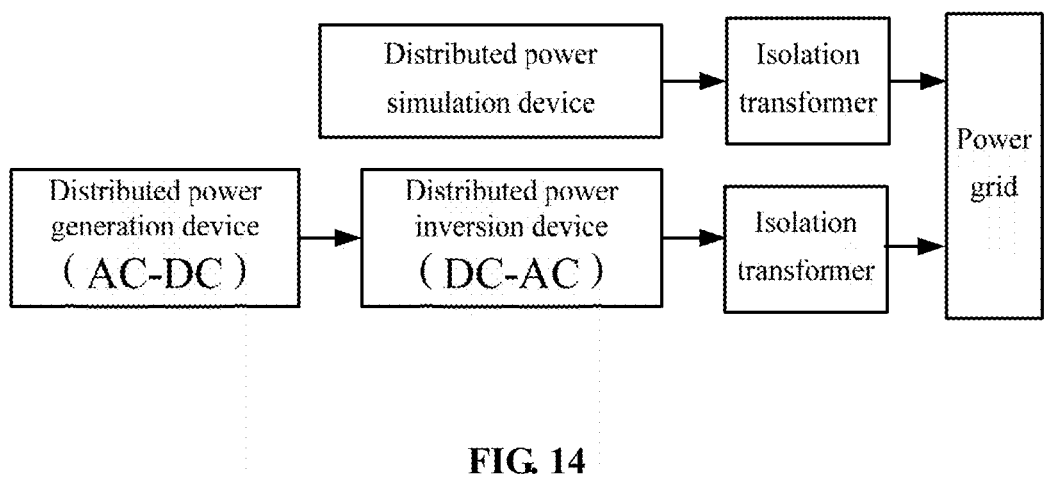
FIG. 14 is a structure diagram of a distributed power simulation device according to an embodiment of the disclosure.

The second manner is an independent mode, that is, different distributed power supplies adopt different implementation manners. For example, power generation with the gas turbine may adopt the power electronic inverter power supply; photovoltaic and photothermal power generation may adopt an AC-DC inverter+DC-AC inverter manner, an AC-DC inverter simulates photovoltaic and photothermal power generation, and a DC-AC inverter simulates a grid-connected device of a DC and AC system; and wind power generation may adopt a manner of driving a power generator by a motor to simulate wind power generation. A structure diagram of the distributed power simulation device is shown in FIG. 14.

(2) The Line Simulation Unit

Figure 15:
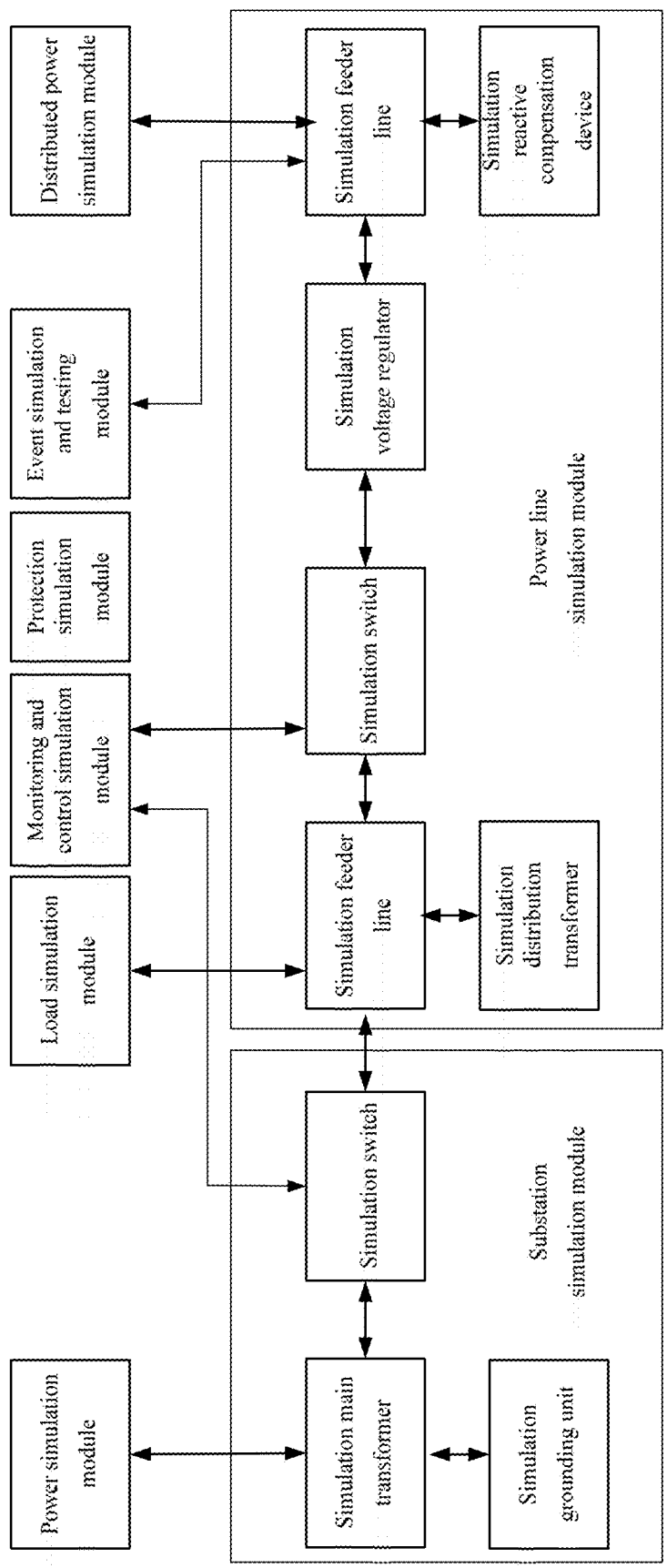
FIG. 15 is a structure diagram of a line simulation unit according to an embodiment of the disclosure.

The line simulation unit includes a substation simulation unit and a power line simulation unit. Here, the substation simulation unit mainly includes a main transformer, a grounding unit and a switch; and the power line simulation unit mainly includes a feeder line, the switch, a transformer, a reactive power compensation device, a voltage adjustment device and the like. A structure diagram of the line simulation unit is shown in FIG. 15. In the embodiment of the disclosure, the substation simulation unit is divided to the line simulation unit, or may exist as an independent module independent from the line simulation unit.

(3) The Load Simulation Unit

Two types of implementation manners are adopted for the load simulation unit. The first type is a controllable simulation load device, called as a linear simulation load device, formed by connecting a resistor, an inductor and a capacitor in series and in parallel. The second type is called as a power electronic inverter load device, and adopts a power electronic inverter as a simulation load, active and reactive power is absorbed from a simulation power grid according to a set rule and the response characteristic of the load on one side of the power electronic inverter, and during application, the other side of the power electronic inverter may be directly connected to a position such as an outgoing line of the power supply network or simulation power supply of the simulation system to implement recycling of energy.

Figure 16:
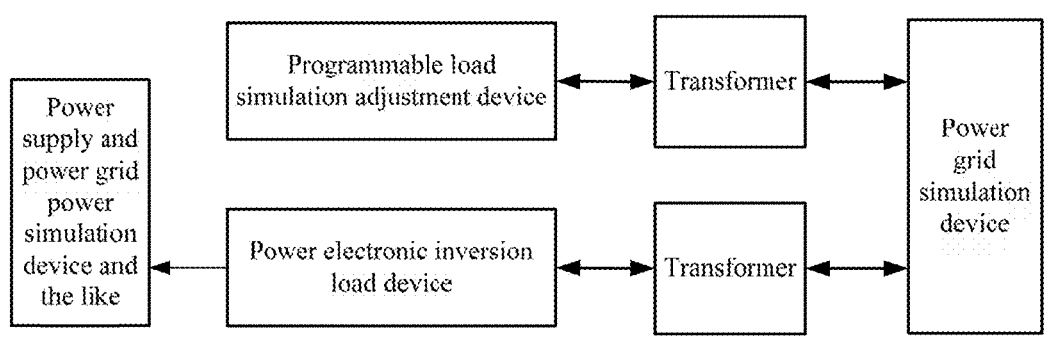
FIG. 16 is a structure diagram of a load simulation unit according to an embodiment of the disclosure.

The linear simulation load device mainly includes the transformer and a programmable load simulation adjustment device. A structure diagram of the load simulation unit is shown in FIG. 16.

(4) The Failure Simulation Unit

Event simulation mainly includes failure simulation and equipment action simulation. Failure simulation includes simulation of an event such as a three-phase short circuit, a two-phase short circuit, a single-phase grounded short circuit, single-phase breakage and two-phase breakage, and also includes simulation of an overvoltage, an overload, undervoltage, three-phase unbalance, insufficient reactive power, a voltage sag, a voltage flicker, a voltage fluctuation and a harmonic phenomenon. Equipment action simulation mainly includes simulation of an event such as load switching, distributed power switching, no-load long-line switching, on-off switching, transformer switching, charging device/energy storage device switching and a line loss.

Event simulation is implemented through an event simulation device, and for example, power grid performance simulation and safety and stability simulation are implemented by adjusting power of the simulation power supply, simulating a three-phase voltage and the load, adjusting three-phase and single-phase power of the load simulation device, adjusting the reactive power compensation device and adjusting a harmonic generator. Equipment action simulation is implemented by controlling switches for access of the load, the distributed power supply, the transformer and the like to the simulation power grid to be turned on and turned off.

(5) The Protection Simulation Unit

The protection simulation unit is responsible for own protection device of the equipment and secondary protection of the physical simulation system.

The protection simulation unit includes two parts. One is own protection function of the equipment, mainly for equipment overheat and overvoltage, that is, when a running temperature and running voltage of the equipment possibly threaten safety of the equipment, the equipment is disconnected from the simulation power supply through a circuit breaker. The second is protection of the simulation power grid, mainly for secondary protection of the simulation power grid. Protection of the simulation power grid mainly includes relay protection integrated into the circuit breaker, a voltage/current detection and comparison judgment function, an independent failure analysis/decision making device and a simulation power grid monitoring main station. When the simulation power grid has a power grid failure characteristic, an analytic judgment is made according to a set protection action rule and a failure diagnosis and analysis program, and actions are further taken to turn on and turn off the switch, thereby implementing secondary protection of the simulation power grid.

(6) The Monitoring Simulation Unit

The monitoring simulation unit mainly includes a low-voltage Potential Transformer (PT), a low Current Transformer (CT), communication, a terminal and a monitoring and control system.

The low-voltage PT is required to meet a measurement requirement on voltages 0-1,500V, the low-voltage CT is required to meet a measurement requirement on currents 0-1,000 A, during configuration, the PT and the CT are both configured according to three phases, and the PT measures phase voltages.

Communication may adopt a wired communication manner, and may also adopt a wireless communication manner, and a local area network is formed to implement communication between the equipment and between the equipment and the monitoring and control system.

2.3: Design of the Topological Structure of the Physical Simulation System.

In order to implement flexible topological structure design of the physical simulation part, the embodiment of the disclosure discloses a flexible topological structure design method, and its idea is as follows.

(1) Terminals in a terminal cabinet are physically connected with connecting terminals of physical components of the power distribution network.

(2) For ensuring physical connection correctness and consistency of the design topological structure, the upper computer software automatically generates a "connecting list" according to connecting characteristics of the designed topological structure, the list including a sequence number and port numbers of each component and a connecting relationship between each terminal of different components. A basic method is as follows: a uniquely corresponding model is designed for each physical component, all required component models are integrated in the software, lines are drawn for connection according to the topological structure required to be designed, and the software automatically recognizes the connecting relationship between the components, and generates the "connecting list", the list including the sequence number of each component, the port numbers of the components and the connecting relationship between ports of the components.

(3) The physical components of the power distribution network are connected in the terminal cabinet according to the "connecting list" to form a physical component topological structure consistent with the topological structure designed by the upper computer.

Figure 17:
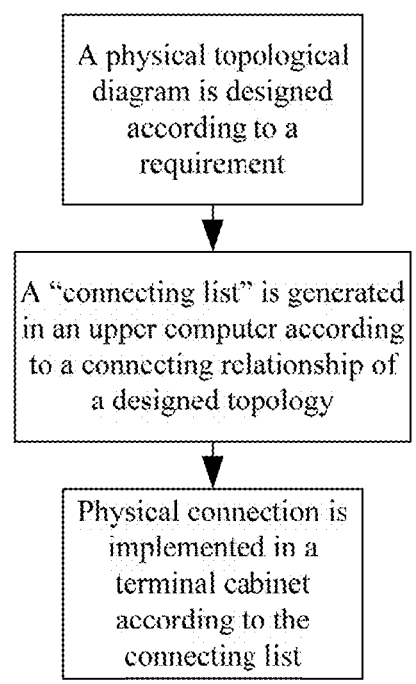
FIG. 17 is a flowchart of a flexible topological structure design method for physical simulation equipment according to an embodiment of the disclosure.

A flowchart of the flexible topological structure design method for the physical simulation equipment is shown in FIG. 17.

4: A D/A Hybrid Interface Device for the Complex Power Distribution Network

Figure 18:
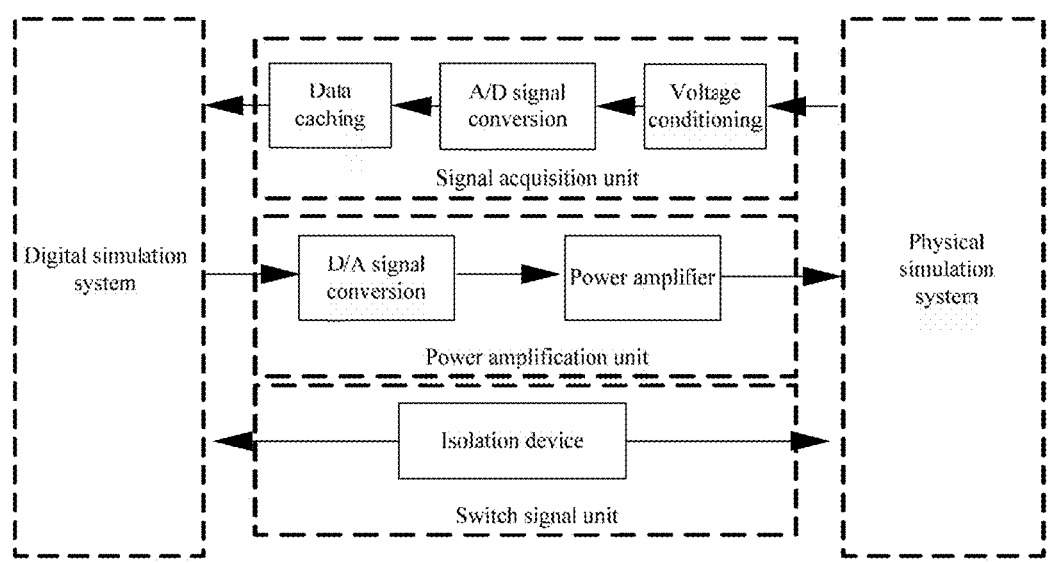
FIG. 18 is a principle diagram of a D/A hybrid interface device according to an embodiment of the disclosure.

Hardware implementation of the D/A hybrid interface device for the complex power distribution network is shown in FIG. 18. The D/A hybrid interface device mainly includes three parts, i.e., a data acquisition unit, a power amplification unit and a switch signal unit.

The data acquisition unit: a voltage and current signal of the physical simulation circuit is converted into a low voltage or low current signal through a mutual inductor or a sensor, and is sent to the D/A hybrid interface device, the A/D data acquisition unit of the D/A hybrid interface device converts an analog signal into a digital signal, and a data buffer part of the data acquisition unit may temporarily cache the digital signal. A buffer action enables a processor which works at a high speed and external low-speed data processing equipment to coordinate for work to ensure data sending integrity.

A main task of the power amplification unit is to implement output power amplification of a digital simulator and convert the digital signal into a real current signal for participating in running of the simulation circuit. At first, a digital current signal of the digital simulation system is converted into an analog voltage signal through a D/A conversion device, the analog voltage signal is converted into a current, for example, a 50 A current, corresponding to a digital quantity through a current power amplifier for conversion into a voltage signal of which an effective value is 5V through the D/A conversion device, the 5V voltage signal is amplified into a 50 A current signal through the 10 A/V-ratio current power amplifier, and the 50 A current signal is injected into the simulation power grid for running.

The switch signal unit: the switch signal unit adopts an isolation device for isolation, and the isolation device includes a photo coupler, a relay and the like. It has two functions: (1) a switch instruction of the digital simulation system is directly transmitted to an analog switch device, for example, a circuit breaker and an air switch, for execution; and 2) a switch state of the physical simulation circuit is sent to the upper computer digital simulation system, for example, after tripping of the circuit breaker, the digital simulation system receives an expiration state through the D/A hybrid interface, and the digital simulation system is synchronously updated.

5: The Simulation Method of the D/A Hybrid Simulation System for the Complex Power Distribution Network The D/A hybrid simulation system for the complex power distribution network implements a hardware-in-the-loop simulation function. The implementation form of the D/A hybrid simulation system may change according to a requirement of a running scenario, for example, the following scenarios.

Figure 19:
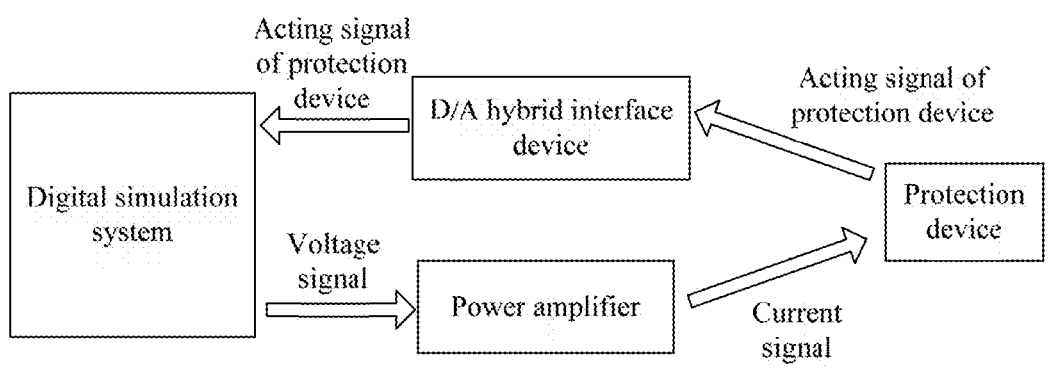
FIG. 19 is a schematic diagram of D/A hybrid simulation of a complex power distribution network running in a digital simulation part according to an embodiment of the disclosure.

(1) D/A hybrid simulation in case that the complex power distribution network runs in a digital simulation part: the digital part performs simulation model construction and real-time power flow and running state simulation according to a given scenario, its running state is reflected to the physical simulation part through the D/A hybrid interface device, and a monitoring and protection device of the physical simulation part monitors the running state of the digital part. If an ""event or failure" occurs at a certain moment when the digital part runs, the real monitoring and protection device of the physical simulation part timely acts according to the event or the failure, and sends an acting signal to the digital part through the simulation interface device, and after receiving the acting signal of the physical simulation part, the digital part performs simulation calculation according to a simulation model after acting, so as to achieve a purpose of testing the monitoring and protection device of the physical simulation part. A schematic diagram of D/A hybrid simulation in case that the complex power distribution network runs in the digital simulation part is shown in FIG. 19.

Figure 20:
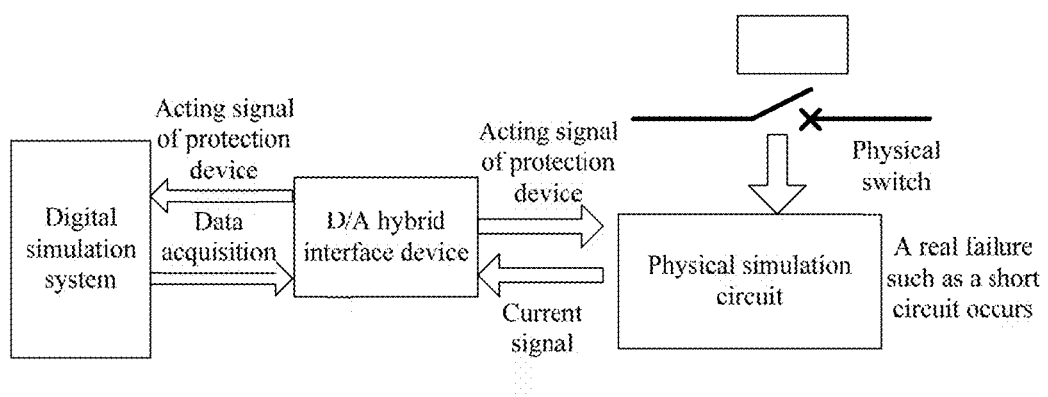
FIG. 20 is a schematic diagram of D/A hybrid simulation of a part of a complex power distribution network running in an analog equipment according to an embodiment of the disclosure.

(2) D/A hybrid simulation in case that the complex power distribution network runs in the analog equipment part: the physical simulation part constructs a simulation topology according to a given scenario, its running state is sent to the digital part through the D/A hybrid interface device after live running of physical simulation, and a monitoring and protection module of the digital part monitors a real running state of physical simulation. If an "event and event simulation device" of the physical simulation part has an event, for example, short circuit, at a certain moment according to a simulation requirement, the digital part monitors such a signal in real time and sends a protection action instruction, the protection action instruction is sent to the real protection device of the physical simulation part through the D/A hybrid interface device, and the protection device acts and isolates a failure point to achieve a purpose of monitoring the physical simulation part by the digital simulation system. A schematic diagram of D/A hybrid simulation in case that the complex power distribution network runs in the analog equipment part is shown in FIG. 20.

Figure 21:
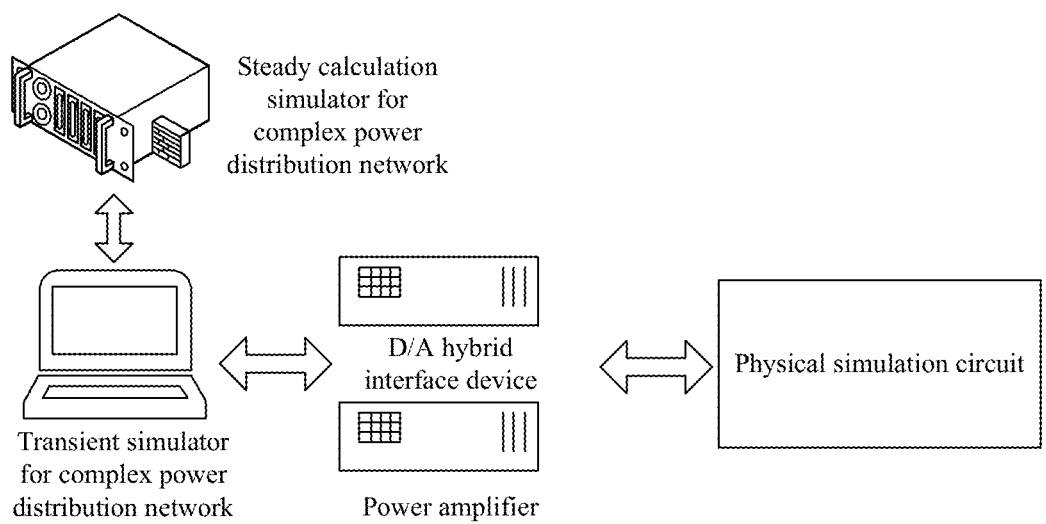
FIG. 21 is a schematic diagram of D/A hybrid simulation with respective digital transient and steady calculation of a complex power distribution network according to an embodiment of the disclosure.

(3) D/A hybrid simulation with respective digital transient and steady calculation of the complex power distribution network: the system is divided into a simulation computer calculating a power grid model of the complex power distribution network and a real-time simulator configured to calculate electronic transient and electromagnetic transient models, two systems are connected by high-speed communication, and the real-time simulation system is connected with the physical simulation circuit through the power amplifier, so that a large-scale multi-scale simulation system may be implemented, and a hardware-in-the-loop simulation system may also be implemented. A schematic diagram of D/A hybrid simulation with respective digital transient and steady calculation of the complex power distribution network is shown in FIG. 21.

In addition, on the basis of the above three basic forms, each module of the digital part and physical simulation may run independently, the digital part may wholly or partially participate in D/A hybrid simulation of the physical simulation part, and all or part of equipment of the physical simulation part may also participate in D/A hybrid simulation of the digital part. Configurations are flexible and variable according to the simulation requirement.

The embodiment of the disclosure further records a computer storage medium, the computer storage medium stores one or more programs, the one or more programs may be executed by one or more processors to implement a multi-time-scale D/A hybrid simulation method for a complex power distribution network.

Those skilled in the art should know that a function of each program in the computer storage medium of the embodiment may be understood with reference to related descriptions about the multi-time-scale D/A hybrid simulation method for the complex power distribution network in the embodiment.

In some embodiments provided by the disclosure, It is to be understood that the disclosed equipment and method may be implemented in another manner. The equipment embodiment described above is only schematic, and for example, division of the units is only logic function division, and other division manners may be adopted during practical implementation. For example, multiple units or components may be combined or integrated into another system, or some characteristics may be neglected or not executed. In addition, coupling, or direct coupling or communication connection between each displayed or discussed component may be indirect coupling or communication connection, implemented through some interfaces, of the equipment or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiment according to a practical requirement.

In addition, each function unit in each embodiment of the disclosure may be integrated into a processing unit, each unit may also exist independently, and two or more than two units may also be integrated into a unit. The integrated unit may be implemented in a hardware form, and may also be implemented in form of hardware and software function unit.

Those skilled in the art should know that: all or part of the steps of the method embodiment may be implemented by instructing related hardware through a program, the program may be stored in a computer-readable storage medium, and the program is executed to execute the steps of the method embodiment; and the storage medium includes: various media capable of storing program codes such as mobile storage equipment, a Read-Only Memory (ROM), a RAM, a magnetic disk or an optical disk.

Or, when being implemented in form of software function module and sold or used as an independent product, the integrated unit of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a piece of computer equipment (which may be a personal computer, a server, network equipment or the like) to execute all or part of the method in each embodiment of the disclosure. The storage medium includes: various media capable of storing program codes such as mobile storage equipment, a ROM, a RAM, a magnetic disk or an optical disk.

The descriptions about specific exemplary implementation solutions of the disclosure are intended for explanation and exemplification. These descriptions are not intended to limit the disclosure to the disclosed precise form, and obviously, there may be many modifications and variations made according to the guidance. The exemplary embodiments are selected and described to explain the specific principle and practical application of the disclosure, thereby enabling those skilled in the art to implement and utilize various exemplary implementation solutions of the disclosure and various selection and changes. The scope of the disclosure is limited by the claims and an equivalent form thereof.

The device embodiment described above is only schematic, wherein the units described as separate parts may or may not be physically separated, and parts displayed as units may or may not be physical units, and namely may be located in the same place, or may also be distributed to multiple network units. Part or all of the units may be selected to achieve the purpose of the solutions of the embodiment according to a practical requirement. Those skilled in the art may understand and implement without creative work.

The embodiments are only adopted not to limit but to describe the technical solutions of the disclosure. Although the disclosure has been described in detail with reference to the embodiments, those skilled in the art may still make modifications or equivalent replacements to the specific implementation modes of the disclosure, and any modifications or equivalent replacements made without departing from the spirit and scope of the disclosure shall fall within the scope of protection of the claims of the disclosure applied for approval.

INDUSTRIAL APPLICABILITY

The embodiment of the disclosure discloses a multi-time-scale D/A hybrid simulation solution for a complex power distribution network, designs a D/A hybrid interface device and a coordination mechanism, and may effectively implement multi-time-scale real-time simulation of equipment (for example, power electronic equipment including a complex topological structure and a novel control strategy) of the complex power distribution network and multi-time-scale simulation analysis on grid connection/disconnection of a distributed power supply such as a wind-driven generator, a photovoltaic power generator and a gas turbine and an electric vehicle as well as interactive influence with the power distribution network. The technical solution of the embodiment of the disclosure provides a more powerful, more long-lasting and deeper support for power grid production operation and management from promotion of development of new-generation most cutting-edge novel technologies for power distribution networks and improvement of running control and analysis levels of the power distribution networks and from the angles of power distribution network planning, design, running regulation and control and the like.

What is claimed is:

1. A multi-time-scale Digital/Analog (D/A) hybrid simulation system for a power distribution network, the D/A hybrid simulation system being configured to implement single voltage class and/or multi-voltage class-based multi-time-scale D/A hybrid simulation of an Alternating Current (AC) power grid, a Direct Current (DC) power grid and an AC and DC hybrid power grid, the D/A hybrid simulation system for the power distribution network comprising:

a digital simulation system, comprising a hardware circuit, and configured to perform D/A hybrid transient simulation on the power distribution network comprising a distributed power supply;

a D/A hybrid interface circuit, configured to perform synchronization for data coordination and time consistency;

a physical simulation circuit, configured to construct a topological structure of a complex power distribution network comprising a static Direct Current (DC) type power supply and a rotating Alternating Current (AC) motor; and a Field-Programmable Gate Array (FPGA), configured to provide a real-time synchronization simulation technology for a simulation layer of the digital simulation system and provide the FPGA-based time adjustment technology for the digital simulation system and the D/A hybrid interface circuit, wherein the digital simulation system and the physical simulation circuit are connected through the D/A hybrid interface circuit to form a multi-time-scale simulation system which is a loop;

the multi-time-scale D/A hybrid simulation system further comprises a terminal cabinet for receiving the physical simulation circuit, terminals in the terminal cabinet are connected with connecting ports of power physical components, and the terminal cabinet is drawn with each component marking symbol and pasted with names and connecting port numbers, each of the power physical components corresponds to a uniquely corresponding model for drawing lines for connection, and a upper computer is configured to recognize a connecting relationship between the components, and generate a connecting list, the connecting list comprising a sequence number of each component, port numbers of the components and a connecting relationship between ports of the components; and a process that the upper computer is configured to generate the connecting list according to a topological relationship between the power physical components is implemented as follows: the upper computer is further configured to traverse all the components in a sequence from small to large sequence numbers of the power physical components and traverse all the ports of the components in a sequence from small to large port numbers to form the connecting list, and record the component sequence numbers and port numbers which are traversed for the first time as primary component sequence numbers and port numbers of new nodes.

2. The multi-time-scale D/A hybrid simulation system for the power distribution network according to claim 1, wherein design of the digital simulation system comprises: design of an interaction layer, design of a modeling layer and design of the simulation layer; the design of the interaction layer is configured to be responsible for visual interaction with a user, construct a simulation circuit by adopting a component model pattern established by the modeling layer and perform parameter setting for simulation components; the design of the modeling layer is configured to be responsible for mathematical modeling for simulation components, component parameter definition, parameter estimation and verification and component pattern appearance design; and the design of the simulation layer is configured to be instructed by the interaction layer to perform simulation calculation on the simulation circuit constructed by the interaction layer on the basis of a simulation component mathematical model established by the modeling layer with reference to a corresponding parameter setting for the simulation components, the simulation calculation comprising design of parallel calculation of an electrical system and a control system and FPGA-based design of a digital frame.

3. The multi-time-scale D/A hybrid simulation system for the power distribution network according to claim 1, wherein the FPGA is further configured to adopt a logical programming-based FPGA to perform hardware-accelerated digital simulation, and simultaneously adopt a multi-FPGA partition paralleling method to accelerate system-level digital simulation of the power distribution network.

4. The multi-time-scale D/A hybrid simulation system for the power distribution network according to claim 1, wherein the D/A hybrid interface circuit comprises:

a data acquisition circuit, configured to acquire a voltage and current signal of a simulation circuit constructed by a simulation modeling layer of the physical simulation circuit and send the voltage and current signal to the digital simulation system;

a power amplification circuit, configured to implement power amplification of the current signal of the digital simulation system and convert a digital signal into a real current signal for participating in running of the physical simulation circuit; and a switch signal circuit, configured to implement isolated sending of a switch signal between the digital simulation system and the physical simulation circuit.

5. The multi-time-scale D/A hybrid simulation system for the power distribution network according to claim 4, wherein the data acquisition circuit comprises a data buffer, Analog/Digital (A/D) data collector and voltage conditioning unit which are connected in sequence; a voltage and current signal of the physical simulation circuit is converted into a voltage or a current signal lower than the voltage and current signal of the physical simulation circuit through a mutual inductor or a sensor, and is sent to the D/A hybrid interface circuit, the A/D data collector of the D/A hybrid interface circuit is configured to convert an analog signal into a digital signal, and the data buffer of the data acquisition circuit is configured to temporarily cache the digital signal;

the power amplification circuit comprises a D/A converter and a power amplifier which are connected in sequence; a signal of the digital simulation system passes the D/A converter at first, and the D/A converter is configured to convert a digital current signal of the digital simulation system into an analog voltage signal, and the analog voltage signal is converted into a current corresponding to a digital quantity through the power amplifier; and the switch signal circuit adopts an isolation device for isolation, and the switch signal circuit is configured for: 1) directly transmitting a switch instruction of the digital simulation system to the physical simulation circuit for execution, and 2) sending a switch state of the physical simulation circuit to a digital part of an upper computer.

6. The multi-time-scale D/A hybrid simulation system for the power distribution network according to claim 1, wherein the FPGA-based time adjustment technology is adopted to achieve a purpose of real-time synchronization of the digital simulation system and the physical simulation circuit, and the FPGA-based time adjustment technology is as follows: a high-speed FPGA with a nanosecond-level error records a reading signal of the digital simulation system, records a calculation cycle time of the digital system according to the reading signal, and punctually drives an A/D signal converter at a time point Δ T before next reading of the digital simulation system to perform A/D conversion on analog data and provide A/D conversion result for the digital simulation system.

7. The multi-time-scale D/A hybrid simulation system for the power distribution network according to claim 1, wherein the physical simulation circuit is configured to implement analog simulation of a multi-voltage class power distribution network, and comprises a power simulation unit, a line simulation unit, a load simulation unit, a protection simulation unit, a monitoring simulation unit and a physical synchronization module; and a power distribution network type object which can be simulated by the physical simulation circuit comprises a single-voltage class or multi-voltage class passive power distribution network between 0 V and 1500 V, active power distribution network, closed-loop running power distribution network, and AC and DC hybrid power distribution network.

8. The multi-time-scale D/A hybrid simulation system for the power distribution network according to claim 1, wherein simulation functions of the multi-time-scale D/A hybrid simulation system comprise that: 1) the physical simulation circuit monitors the digital simulation system: model real-time power flow running state simulation is completely performed in the digital simulation system, a monitoring and protection device of the physical simulation circuit monitors a running state of the digital simulation system, and if an event or failure occurs at a certain moment when the digital simulation system runs, the real monitoring and protection device of the physical simulation circuit timely acts according to the event or the failure, and sends an acting signal to the digital simulation system through the D/A hybrid interface circuit to achieve a purpose of testing the monitoring and protection device of the physical simulation circuit; 2) the digital simulation system monitors the physical simulation circuit: the physical simulation circuit constructs a simulation topology according to a given scenario, its running state is sent to the digital simulation system through the D/A hybrid interface circuit, and a monitoring and protection module of the digital simulation system monitors a real running state of physical simulation to achieve a purpose of monitoring the physical simulation circuit by the digital simulation system; and 3) D/A hybrid simulation with respective digital transient and steady calculation of the complex power distribution network: the system is divided into a simulation computer calculating a power grid model of the complex power distribution network and a real-time simulator configured to calculate electronic transient and electromagnetic transient models, two systems are connected by high-speed communication between 5 MB/S and 100 MB/S, and the real-time simulation system is connected with the physical simulation circuit through a power amplifier.

9. A simulation method of the multi-time-scale Digital/Analog (D/A) hybrid simulation system for the power distribution network according to claim 1, comprising the following scenarios: (1) D/A hybrid simulation of the complex power distribution network running in a digital simulation system; (2) D/A hybrid simulation of a part of the complex power distribution network running in a physical simulation equipment; and (3) D/A hybrid simulation in which digital transient calculation and steady calculation of the complex power distribution network are performed respectively, wherein based on the above three basic forms, modules in the digital simulation system and the physical simulation circuit all run independently, the digital simulation system wholly or partially participates in D/A hybrid simulation of the physical simulation circuit, and all or part of equipment of the physical simulation circuit participates in D/A hybrid simulation of the digital simulation system.

10. A non-transitory computer storage medium having stored therein computer-executable instructions for executing the method according to claim 9.

* * * * *